(12) United States Patent
Mikic et al.

(10) Patent No.: US 12,546,126 B2
(45) Date of Patent: Feb. 10, 2026

(54) SCAFFOLD NODE

(71) Applicant: PERI SE, Weissenhorn (DE)

(72) Inventors: Erzad Mikic, Karlsruhe (DE);
Bernhard Steinle, Petaling Jaya (MY);
Juergen Bulling, Singapore (SG)

(73) Assignee: PERI SE, Weissenhorn (DE)

( * ) Notice: Subject to any disclaimer, the term of this patent is extended or adjusted under 35 U.S.C. 154(b) by 900 days.

(21) Appl. No.: 17/297,367

(22) PCT Filed: Oct. 21, 2019

(86) PCT No.: PCT/DE2019/100916
§ 371 (c)(1),
(2) Date: May 26, 2021

(87) PCT Pub. No.: WO2020/108685
PCT Pub. Date: Jun. 4, 2020

(65) Prior Publication Data
US 2022/0010568 A1    Jan. 13, 2022

(30) Foreign Application Priority Data

Nov. 26, 2018  (DE) .................... 20 2018 106 709.5
Apr. 20, 2019  (DE) .................... 20 2019 102 265.5
Jun. 25, 2019  (DE) .................... 10 2019 117 082.6

(51) Int. Cl.
*E04G 7/24* (2006.01)
*E04G 1/06* (2006.01)
(Continued)

(52) U.S. Cl.
CPC ............... *E04G 7/24* (2013.01); *E04G 1/06* (2013.01); *E04G 7/32* (2013.01); *E04G 7/34* (2013.01)

(58) Field of Classification Search
CPC .... E04G 1/06; E04G 7/24; E04G 7/32; E04G 7/34
See application file for complete search history.

(56) References Cited

U.S. PATENT DOCUMENTS 1,420,670 A * 6/1922 Schuette ................. B21J 15/46
                                                            403/292
1,880,231 A * 10/1932 Bearly .................... E21B 15/00
                                                            403/175
(Continued)

FOREIGN PATENT DOCUMENTS

| CA | 2292685 | 6/2000 |
| CN | 1490481 | 4/2004 |

(Continued)

OTHER PUBLICATIONS

DIBt Allgemeine baufausichtliche Zulassung: Gerüstsystem "PERI UP Easy" (Z-8.1-957), Aug. 18, 2017, Anl. B S. 49, 62 ,65.—Zulassung.

*Primary Examiner* — Colleen M Chavchavadze
(74) *Attorney, Agent, or Firm* — SLEMAN & LUND LLP

(57) ABSTRACT

A scaffold node for connecting scaffold elements extending in different spatial directions, comprising a connecting sleeve which is provided as a coupling point for two scaffold components, in particular for two vertical posts or for a vertical post and a spindle nut post, and at least one coupling element which is used to connect the scaffold node to further scaffold components or scaffold elements. A scaffold portion comprising a scaffold node and further scaffold elements.

11 Claims, 9 Drawing Sheets

(51) Int. Cl.
*E04G 7/32* (2006.01)
*E04G 7/34* (2006.01)

(56) References Cited

U.S. PATENT DOCUMENTS

| | | | | |
|---|---|---|---|---|
| 2,509,363 | A * | 5/1950 | Page | F16L 15/04 |
| | | | | 277/625 |
| 3,095,070 | A * | 6/1963 | Mcdonald | E04G 1/14 |
| | | | | 52/646 |
| 3,707,304 | A * | 12/1972 | Gostling | F16B 2/14 |
| | | | | 403/310 |
| 3,992,118 | A * | 11/1976 | Siegers | E04G 7/308 |
| | | | | 182/186.7 |
| 4,039,264 | A * | 8/1977 | Sharp | F16B 7/0486 |
| | | | | 403/49 |
| 4,549,634 | A * | 10/1985 | Duncan | E04G 7/307 |
| | | | | 403/49 |
| 4,718,787 | A * | 1/1988 | Bahloul | E04G 7/308 |
| | | | | 403/175 |
| 4,949,525 | A * | 8/1990 | Weaver | E04H 12/32 |
| | | | | 403/379.3 |
| 5,207,527 | A * | 5/1993 | Duncan | E04G 7/32 |
| | | | | 182/186.8 |
| 5,285,869 | A * | 2/1994 | Rock | E04G 7/301 |
| | | | | 403/373 |
| 5,367,852 | A * | 11/1994 | Masuda | E04G 1/06 |
| | | | | 403/174 |
| 5,411,113 | A * | 5/1995 | Lubinski | E04G 7/307 |
| | | | | 182/186.7 |
| 5,605,204 | A * | 2/1997 | Ausejo | E04G 7/307 |
| | | | | 182/186.7 |
| 5,868,223 | A * | 2/1999 | Lubinski | E04G 7/307 |
| | | | | 403/217 |
| 6,027,276 | A * | 2/2000 | Schworer | F16B 7/048 |
| | | | | 182/186.8 |
| 6,722,471 | B2 * | 4/2004 | Wolfe | E04G 5/16 |
| | | | | 182/186.7 |
| 9,637,937 | B2 * | 5/2017 | Wallther | E04G 7/22 |
| 2016/0281375 | A1 * | 9/2016 | Rogers | E04G 7/307 |

FOREIGN PATENT DOCUMENTS

| | | | |
|---|---|---|---|
| CN | 101014747 | 8/2007 | |
| CN | 201050194 | 4/2008 | |
| CN | 102094515 A | 6/2011 | |
| CN | 102498252 | 6/2012 | |
| CN | 102094515 B | 9/2012 | |
| CN | 102704670 | 10/2012 | |
| CN | 203654721 U | 6/2014 | |
| CN | 207499395 | 6/2018 | |
| DE | 1803626 | 6/1970 | |
| DE | 3022439 | 12/1981 | |
| DE | 19602737 A1 * | 7/1997 | E04G 7/30 |
| DE | 69720422 | 10/2003 | |
| DE | 102016223824 | 5/2018 | |
| DE | 202018106709 | 12/2018 | |
| EP | 0623716 A1 | 11/1994 | |
| EP | 1013849 A1 | 6/2000 | |
| GB | 338856 | 11/1930 | |
| GB | 926055 A | 5/1963 | |
| GB | 2518159 A | 3/2015 | |
| JP | H11229620 | 8/1999 | |
| JP | 2014031633 | 2/2014 | |
| RU | 2194138 C1 | 12/2002 | |
| WO | 9301380 A1 | 1/1993 | |
| WO | 2015176103 A1 | 11/2015 | |

* cited by examiner

SCAFFOLD NODE

FIELD OF THE INVENTION

The invention relates to a scaffold node for connecting scaffold components extending in different spatial directions, comprising a connecting sleeve which is provided as a coupling point for two vertical posts or for a vertical post and a spindle nut post, and at least one coupling element which is used to connect the scaffold node to scaffold components or scaffold elements. The invention also relates to a scaffold portion comprising a scaffold node and further scaffold elements.

BACKGROUND OF THE INVENTION

Scaffolding is used in the construction sector for various tasks. Facade scaffolding is used to configure, for example to paint, the outer surfaces of buildings. In civil engineering, scaffolding or supporting structures are used to position and hold in place a wide range of structural components. Such structural components may be prefabricated concrete parts, steel girders or steel structures, for example. Furthermore, elements required for erecting structures, such as temporary structures or formworks, can be positioned using supporting structures. Finally, scaffolding is also used in the service or inspection sector, for example, to safely bring workers in large process manufacturing plants, such as refineries, to the parts of the plant to be overhauled. In general, the basic requirements for scaffolding are that it must be easy to transport and set up. When setting up scaffolding, vertically extending elements, horizontally extending elements and often also diagonally extending elements have to be interconnected to form a supporting structure. Scaffolding is known from the prior art which has, on the vertically extending elements thereof, devices which make it possible for other elements, thus for example horizontally extending elements, to be connected. This solution is disadvantageous in that these vertically extending elements are relatively complicated in design. In addition, these vertically extending elements are bulky on account of the device for connecting further scaffold elements and are thus difficult to transport. In practice, it is often the case on a construction site that scaffold elements from different manufacturers and from different construction years are mixed together to form a scaffold. This is often problematic in that scaffold elements from different manufacturers vary in quality and in dimensional tolerances. Different dimensional tolerances of the elements often lead to connection problems, especially in the regions in which forces have to be transferred between scaffold elements. Under certain circumstances, different scaffold elements cannot be interconnected at all, or the connection between two elements is unstable or has insufficient load-bearing capability.

SUMMARY OF THE INVENTION

The problem addressed by the present invention is therefore that of proposing a solution to enable the secure interconnection of scaffold elements having different dimensional tolerances, and at the same time to make it possible to quickly and safely set up a scaffold.

The problem addressed by the invention is solved by a scaffold node for connecting scaffold elements extending in different spatial directions, comprising a connecting sleeve which is provided as a coupling point for two scaffold components, in particular for two vertical posts or for a vertical post and a spindle nut post, at least one coupling element which is used to connect the scaffold node to further scaffold components or scaffold elements, wherein the connecting sleeve has at least one inner projection which protrudes radially inwardly beyond an inner lateral surface of the connecting sleeve, wherein the at least one inner projection protrudes abruptly relative to the inner lateral surface of the connecting sleeve and has at least one load-absorption surface which is provided for absorbing loads oriented in the longitudinal direction of the connecting sleeve from a scaffold component, and which has a projection height from its outer edge adjacent to the inner lateral surface to its inner edge that is oriented radially toward the inside of the connecting sleeve.

A scaffold node according to the invention comprises a connecting sleeve which is usually vertically aligned in the use state, and a coupling element arranged on this connecting sleeve. "Use state" means the state in which the scaffold node is installed in a scaffold to connect a plurality of scaffold elements. "Use state" also means the set-up or dismantling of a scaffold using a scaffold node. The connecting sleeve is used to connect vertically extending scaffold elements. Vertically extending scaffold elements of this kind are vertical posts, for example. Such a vertical post can also be formed by a simple tube, which is hollow inside. The connecting sleeve can be formed, for example, by a simple tube portion. The connecting sleeve serves in this case as a coupling point between the scaffold elements oriented vertically in the use state. When two vertically extending scaffold elements are inserted into the connecting sleeve, they are coupled together by the connecting sleeve. According to the invention, it is also possible to insert a spindle nut post into the connecting sleeve and to couple it with a vertical post there. A spindle nut post of this kind is described in more detail below in connection with a scaffold portion according to the invention.

A scaffold node according to the invention further comprises a coupling element which is used to connect the scaffold node to scaffold components or scaffold elements. The coupling element is connected to the connecting sleeve or fastened thereto. The coupling element can be designed in various ways. The coupling element is used to connect the scaffold node to scaffold components or scaffold elements which do not extend vertically in the use state. The scaffold components or scaffold elements fastened to the coupling element usually extend horizontally or diagonally in the scaffold in the use state.

In a scaffold node according to the invention, the coupling element is rigidly connected to the connecting sleeve. This is understood to mean that the coupling element and connecting sleeve form a rigid unit. The connecting sleeve is usually substantially cylindrical in shape and hollow inside. The inner surface of the connecting sleeve is referred to as the inner lateral surface. When introducing vertically extending scaffold elements, such as vertical posts, the outer surfaces of said vertically extending scaffold elements are parallel to the inner lateral surface of the connecting sleeve. A scaffold node according to the invention comprises at least one inner projection which protrudes radially toward the inside of the connecting sleeve beyond the inner lateral surface. This inner projection is of considerable importance for the functioning of the scaffold node according to the invention. Vertically extending scaffold elements, such as vertical posts, have dimensional tolerances in their outer dimensions. The cheaper these vertically extending scaffold elements are made, the greater the tolerances in their outer dimensions. When setting up a scaffold, said dimensional tolerances result in problems of securely positioning and coupling the vertically extending scaffold elements with respect to one other and thus of achieving a desired friction fit in the scaffold. Due to the fact that the inner projection protrudes beyond the inner lateral surface, an introduced vertically extending scaffold element abuts the inner projection. The inner projection protrudes abruptly starting from the inner lateral surface of the connecting sleeve. This means that the inner projection is or can be in the form of a sharp-edged, in particular non-continuous transition between the inner lateral surface and the inner projection. On account of this abrupt protrusion of the inner projection and the in particular non-continuous transition from the inner lateral surface to the inner projection, said projection is suitable, in the use state, for absorbing vertical loads from other scaffold elements or scaffold components, such as vertical posts or spindle nut posts, and conveying said loads into the connecting sleeve. In order to absorb such vertical loads, the inner projection according to the invention has at least one load-absorption surface which is provided for absorbing loads oriented in the longitudinal direction of the connecting sleeve from a scaffold component. The load-absorption surface is usually designed inherently flat. Vertically extending scaffold elements introduced into the scaffold node, in particular into the connecting sleeve, rest on the load-absorption surface of the at least one, abruptly protruding inner projection in the use state. The load-absorption has a projection height from its outer edge adjacent to the inner lateral surface to its inner edge that is oriented radially toward the inside of the connecting sleeve. This projection height is selected such that vertically extending scaffold elements such as vertical posts always rest on the load-absorption surface, despite tolerances in their dimensions. The projection height is favorably selected such that even vertically extending scaffold elements having a smaller outer diameter than the inner diameter of the connecting sleeve still rest on the load-absorption surface with a sufficient resting surface area, and thus a reliable transmission of force is always ensured in the vertical direction from the vertically extending scaffold element to the scaffold node.

There is an in particular sharp-edged transition between the inner lateral surface of the connecting sleeve and the inner projection. The inner projection thus protrudes abruptly beyond the inner lateral surface. On account of this abrupt protrusion of the inner projection, said projection is suitable for vertically extending scaffold elements inserted into the connecting sleeve resting on said inner projection. The vertically extending scaffold elements thus transmit vertically directed forces and loads to the inner projection of the scaffold node. These forces and loads are thus introduced into the scaffold node.

In the described embodiments, the inner projection has a load-absorption surface for absorbing these forces and loads. Favorably, said load-absorption surface is perpendicular to the inner lateral surface of the connecting sleeve. Alternatively, the load-absorption surface can also be inclined with respect to the inner lateral surface.

For the reliable functioning of the load-absorption surface, a specific width of the load-absorption surface is required, which corresponds to the projection height of the inner projection. It has been found to be particularly advantageous for the projection height to be equal to or greater than the wall thickness of the connecting sleeve. Such a projection height ensures that a vertically extending scaffold element having tolerances, which is inserted into the connecting sleeve, rests securely and stably on the load-absorption surface.

Horizontal loads can be introduced into the scaffold node according to the invention via the coupling element. Usually, however, horizontally extending scaffold elements which are connected to the scaffold node are designed so that they touch the outer lateral surface of the connecting sleeve when assembled. As a result, moments from connected horizontally extending scaffold elements can be introduced into the scaffold node.

A scaffold node according to the invention offers several advantages over the prior art: The scaffold node is very simple in design and has compact dimensions. As a result, the scaffold node is easy to manufacture and transport. In addition, a scaffold node according to the invention makes it possible to use other scaffold elements that are also very simple in design. The scaffold node assumes the function of connecting or coupling scaffold elements that are oriented in different directions. This connecting function does not therefore have to be provided at the scaffold elements themselves. In particular, the vertically extending scaffold elements, which in the prior art have devices for connecting other scaffold elements, can be much simpler in design when using a scaffold node according to the invention. Vertical scaffold elements, for example vertical posts, can be formed from simple tube portions. Such tube portions can be easily made from standard materials. Depending on individual requirements, a wide variety of lengths of vertically extending scaffold elements can be easily connected to the scaffold node. This results in a very simple adjustment of the scaffold height or the distance between two scaffold platforms. The vertically extending scaffold elements formed from simple tube portions can also be stored and transported very easily, since they have no outwardly protruding elements. Scaffold elements extending in other spatial directions can also be connected to a scaffold node according to the invention. By means of this possibility, two-dimensional and three-dimensional scaffold structures can be set up quickly and simply with a scaffold node consisting of one-dimensional scaffold elements. One-dimensional scaffold elements are to be understood in this case as rod-shaped or tubular elements. In the prior art, horizontally and diagonally extending scaffold elements are occasionally assembled into prefabricated, two-dimensional frames. These prefabricated frames are then connected to vertically extending scaffold elements using devices, resulting in the required three-dimensional scaffold structure. This concept involving the prefabricated frame is disadvantageous in that these frames are significantly bulkier than one-dimensional scaffold elements. Such frames are thus uneconomical and impractical to transport. By means of a scaffold node according to the invention, there is no need to provide two-dimensional, prefabricated frames. A wide range of one-dimensional scaffold elements can be very quickly and easily connected to the scaffold node, and thus the required three-dimensional scaffold structure can be created at the construction site directly from one-dimensional scaffold elements. The transport of the required scaffold elements to the construction site is thus made easier and more economical, since the one-dimensional scaffold elements can be transported with a significantly higher packing density than two-dimensional structures, such as frames. A scaffold node according to the invention results in significantly simplified transport of a scaffold and, at the same time, makes it possible to have a simple yet very adaptable design of three-dimensional scaffold structures.

In practice, sometimes different terminology is used for the terminology used in this description for the scaffold node and for the scaffold portion described later. For instance, a scaffold node according to the invention may also be referred to as a node sleeve.

In a particularly preferred embodiment, the projection height is equal to or greater than the wall thickness of the connecting sleeve. Such a projection height ensures that vertically extending scaffold elements can reliably come into operative connection with the load-absorption surface of the abruptly protruding inner projection over an overall, broad tolerance range, and that vertical loads are always reliably transmitted to the scaffold node.

In a further preferred embodiment, the coupling element is designed as a connecting disk, the connecting disk having a receiving surface having a plurality of receiving recesses, and the receiving recesses being provided for being connected to further scaffold elements, such as horizontal bars or diagonal struts, and the connecting disk being rigidly connected to the connecting sleeve, and the receiving surface being substantially perpendicular to the overall length of the connecting sleeve. The connecting disk has a receiving surface. This receiving surface is the largest surface of the connecting disk. Usually, the receiving surface is substantially larger than the side surfaces of the connecting disk. The receiving surface is substantially perpendicular to the axis of symmetry or to the overall length of the connecting sleeve. A plurality of receiving recesses are arranged in the receiving surface and are used for connecting to other scaffold elements. These other scaffold elements are usually connected in a form-fitting manner to the connecting disk, and in particular to the surfaces of the receiving recesses and the receiving surface.

In an alternative embodiment, the coupling element is formed by two Cuplock elements that are collar-shaped, one Cuplock element being rigidly connected to the connecting sleeve and the other Cuplock element being mounted so as to be axially displaceable relative to the connecting sleeve, and there being a gap between an inner diameter of the Cuplock elements and the outer diameter of the connecting sleeve, into which gap an end piece of a horizontal strut can be introduced. In this alternative embodiment, the coupling element of the scaffold node is formed by two Cuplock elements. By means of these Cuplock elements, other scaffold components or elements, which extend horizontally or diagonally in particular in the use state, can be connected to the scaffold node. Said Cuplock elements are collar-shaped, which means that they have a smaller diameter at one of their ends than at their opposite ends. One of the Cuplock elements is rigidly connected to the connecting sleeve, and the other Cuplock element is axially displaceably arranged on the connecting sleeve. In order to fasten a scaffold element, the axially displaceable Cuplock element is moved away from the axially fixed Cuplock element. Subsequently, an end piece of a connecting element, for example of a horizontal strut, is introduced between the two Cuplock elements. In order to produce a form-fit between the scaffold node and the horizontal strut, there is a gap between the Cuplock elements and the outer lateral surface of the connecting sleeve, into which gap an end piece of a horizontal strut, which end piece is formed as a negative accordingly, can be introduced. If the horizontal strut is placed into said gap by its end piece, the axially displaceable Cuplock element is moved back to the axially fixed Cuplock element until the end piece of the horizontal strut is form-fittingly enclosed between the two Cuplock elements. This alternative embodiment of a coupling element is particularly easy to use.

In another alternative embodiment, the coupling element is formed by a plurality, in particular four, wedge-locking pockets, a wedge-shaped end region of a horizontal strut fitting into a wedge-locking pocket, and it being possible to insert the wedge-shaped end region of the horizontal strut into the wedge-locking pockets and to secure it therein. In this embodiment, scaffold elements are connected to the scaffold node by means of a coupling element designed as a plurality of wedge-locking pockets. Such a scaffold element may for example be formed by a horizontal strut having an end region in the shape of a wedge. A plurality of wedge-locking pockets which form the negative shape to the wedge-shaped end region of the horizontal strut are provided as the coupling element. For the connection, the wedge-shaped end region of the horizontal strut is simply inserted into the correspondingly shaped wedge-locking pocket, which establishes a form-fit between the horizontal strut and the coupling element. The horizontal strut is secured to the scaffold node on account of this form-fit. Favorably, a plurality of wedge-locking pockets are provided which are arranged at regular intervals or angles around the circumference of the connecting sleeve.

In a further alternative embodiment, the coupling element is formed by a disk washer which is rigidly connected to the connecting sleeve, and a plurality of substantially wedge-shaped recesses are introduced into the disk washer which penetrate the disk washer, the wedge-shaped recesses being provided to be connected to horizontally extending scaffold elements, such as a horizontal strut. A disk washer is usually designed as a circular ring and represents an alternative embodiment of a coupling element. The disk washer is rigidly connected to the connecting sleeve and surrounds it. The disk washer has a plurality of wedge-shaped recesses which are provided for a form-fitting connection to another scaffold element, for example a horizontal strut. Such a horizontal strut has an end piece which corresponds to such a wedge-shaped recess in cross section and which can be form-fittingly inserted into the disk washer, as a result of which the horizontal strut is rigidly secured to the coupling element designed as a disk washer. Favorably, the disk washer has an edge that protrudes at its outer circumference in the longitudinal direction of the connecting sleeve. This edge makes it possible for there to be an additional form-fitting connection to the horizontal strut and thus improves the reliability of the connection between the scaffold element and scaffold node.

In a preferred embodiment, it is provided that the at least one inner projection is a part of the connecting disk, the connecting disk dividing the connecting sleeve into two parts, and the end face of each part of the connecting sleeve being rigidly connected to a receiving surface of the connecting disk. In this embodiment, the inner projection is formed by a part of the connecting disk. This is a difference from the previously described embodiments, in which the inner projection is formed by an indentation in the wall of the connecting sleeve. A sharp-edged transition between the inner lateral surface and the inner projection can be achieved particularly easily by the inner projection being part of the connecting disk. In this embodiment, the connecting sleeve is designed in two parts. Each part of the connecting sleeve is rigidly connected at the end face thereof to a receiving surface of the connecting disk. The connecting disk thus protrudes into the interior of the connecting sleeve and forms the inner projection therein. This embodiment has the further advantage that vertical scaffold elements inserted into the connecting sleeve are directly in contact with the horizontally extending connecting disk. As a result, there is also a good flow of force in the horizontal or diagonal direction through the scaffold node.

Furthermore, it is favorably provided that the connecting disk has an in particular circular recess, and at least one portion outside this recess forms the inner projection. In this embodiment, a recess is favorably provided in the middle of the connecting disk. This recess is used so that vertically extending scaffold elements can be pushed through the entire interior of the connecting sleeve. This is particularly important when a spindle nut post in conjunction with a scaffold spindle is to be inserted into the scaffold node. The scaffold spindle can then be moved vertically through the recess in the connecting disk. Scaffold components or scaffold elements that directly transfer a load and extend vertically, such as a vertical post or a post shaft of a spindle nut post, have a larger diameter than the recess in the connecting disk and thus cannot be moved through this recess. The recess in the connecting disk is not suitable for scaffold elements of this kind to be pushed through. The vertically load-bearing scaffold elements come into contact with the abrupt inner projection arranged around the recess and transmit vertical loads to the scaffold node as described above. The edge of the recess in the connecting disk simultaneously forms the inner projection inside the connecting sleeve. The projection height or width of the inner projection can thus be adjusted by dimensioning the recess in the connecting disk. The shape and diameter of the recess in the connecting disk is very easy to produce and manipulate since the connecting disk is a planar component which can be easily machined by punching, laser cutting, drilling or the like. Thus, this embodiment combines the advantages of a simple design and cost-effective production.

In a further embodiment, it is provided that the connecting sleeve is made in one piece and the inner projection is formed by an impression that extends radially around the circumference of the connecting sleeve, and the connecting disk is fastened to the outer lateral surface of the connecting sleeve. In this embodiment, an inner projection, which protrudes abruptly beyond the inner lateral surface of the connecting sleeve, is also realized by an indentation in the wall of a one-piece connecting sleeve. For this purpose, an impression that extends in the circumferential direction is made in the connecting sleeve. This impression then protrudes inward and forms the inner projection, which also has a load-absorption surface. By means of this load-absorption surface produced by an impression, as described above, forces and loads from an inserted, vertically extending scaffold element can be introduced into the connecting sleeve, and thus into the scaffold node. Such an inner projection formed by an indentation in the wall also has a non-continuous, abrupt transition from the inner lateral surface to the load-absorption surface. Such an impressed, abrupt transition can be achieved by suitably sharp-edged stamping tools that are used to indent the wall. This embodiment is simpler, since it comprises a one-piece connecting sleeve. The circumferential impression nevertheless represents a massive deformation of the wall of the connecting sleeve, and therefore a corresponding device has to be present for such an impression. In this embodiment, the connecting disk is fastened to the connecting sleeve from outside and does not divide the connecting sleeve into two parts.

In a further embodiment, at least one further inner projection is formed by indenting the wall of the connecting sleeve, the inner projection having a constant projection height inside the connecting sleeve in the longitudinal direction of the connecting sleeve, or the inner projection, starting from the inner lateral surface of the connecting sleeve, rising steadily up to the projection height and falling. In this embodiment, in addition to the inner projection that protrudes abruptly from the inner lateral surface of the connecting sleeve, a further inner projection is provided which does not have an abrupt transition to the inner lateral surface. This further inner projection is formed by an indentation in the wall of the connecting sleeve. In order to produce such a further inner projection, a corresponding stamping tool is used, which produces an inner projection having a continuous transition to the inner lateral surface. "Wall" is understood to mean the wall of the tubular connecting sleeve. An indentation of this kind can be made by stamping or punching, for example. In this embodiment, the further inner projection consists of a portion of the connecting sleeve which obtains its shape in a deforming process. Usually, in order to produce a connecting sleeve according to this embodiment, a tube portion made of a metal material is used as a base, and the further inner projection is subsequently formed into the wall by deforming. A connecting sleeve having such a further inner projection can thus be produced very easily from an inexpensive base material. In this embodiment, the further inner projection extends along the overall length of the connecting sleeve and has a constant projection height. Projection height is understood to mean the measure by which the point of the inner projection reaching furthest into the interior of the connecting sleeve protrudes beyond the inner lateral surface. Both the inner projection that protrudes abruptly beyond the inner lateral surface and the further inner projection have a projection height. In an alternative embodiment, the further inner projection does not extend along the entire overall length but extends over only a part of the connecting sleeve based on the length. In this embodiment, there is a smooth transition between the inner lateral surface and the further inner projection. Starting from the inner lateral surface, the projection height increases steadily up to the largest projection height and falls steadily on the other side of the projection height back to the inner lateral surface.

The further inner projection of a scaffold node ensures centering of vertical scaffold elements introduced into the connecting sleeve. Particularly favorable for this centering is the provision of a plurality of further inner projections, which then interact during centering.

One or more further inner projections can be selectively arranged at favorable locations inside the connecting sleeve in order to achieve the desired centering of the vertically extending scaffold elements in the connecting sleeve. The achieved centering ensures that two vertically extending scaffold elements, of which one is inserted into the scaffold node from each side, are aligned with each other and thus make it possible for there to be good and efficient dissipation of force from vertical loads.

Furthermore, the at least one further inner projection is designed as a longitudinal bead which extends over the overall length of the connecting sleeve. In this embodiment, the further inner projection has a constant projection height. Such a further inner projection designed as a longitudinal bead can be easily produced by impressing into the connecting sleeve from outside. Such a further inner projection guides vertically extending scaffold elements that are inserted into the connecting sleeve along the overall length of the connecting sleeve. Providing three or more of such further inner projections is particularly advantageous, since the centering effect on the introduced scaffold elements is significantly improved again by a larger number of further inner projections.

In a preferred embodiment of the proposal, two, preferably three, more preferably four further inner projections designed as longitudinal beads are provided which are distributed uniformly on the inner lateral surface in the circumferential direction. A uniform distribution of a plurality of further inner projections in the circumferential direction inside the connecting sleeve is particularly favorable for effective centering of introduced scaffold elements in the scaffold node.

Furthermore, it is provided that the connecting sleeve is made in one piece, and the connecting disk is fastened, in particular welded, to the outer lateral surface of the connecting sleeve. A particularly simple design of a scaffold node is achieved in the described embodiment by a one-piece connecting sleeve with a connecting disk rigidly connected thereto.

In a further embodiment, it is provided that the at least one further inner projection is designed as a stamping point which has a stamping center and which, starting from the inner lateral surface, steadily rises up to the projection height in all radial directions around the stamping center, the projection height being located in the stamping center. In this embodiment, the further inner projection is also formed by an indentation in the wall of the connecting sleeve. This indentation is produced by stamping using a pointed stamping tool. As a result, a further inner projection designed as a stamping point is formed inside the connecting sleeve. This deforming process creates a continuous transition between the inner lateral surface and the further inner projection designed as a stamping point. The further inner projection has a stamping center, at which the projection height is at its greatest. Around the stamping center, the projection height drops steadily to the inner lateral surface. On account of these smooth transitions, such a further inner projection is particularly suitable for guiding a scaffold element inserted into the connecting sleeve, for example a vertical post. Starting from the inner lateral surface, the scaffold element slides smoothly over the further inner projection and is thus centered when it is inserted into the connecting sleeve. The production of a further inner projection designed as a stamping point is also particularly simple since, starting from a tubular connecting sleeve, only a simple stamping tool is required for producing the further inner projection. Other components are not required.

In an advantageous embodiment, a plurality of inner projections designed as stamping points are provided which are arranged in at least two rings, the rings being parallel to the receiving surface of the connecting disk and the rings being mutually spaced, and the further inner projections along the rings being uniformly distributed on the inner lateral surface in the circumferential direction. In this embodiment, a plurality of further inner projections are provided which jointly guide and center a scaffold element introduced into the connecting sleeve. The further inner projections are arranged in rings which extend in parallel with the connecting disk and in parallel with the end faces of the connecting sleeve. The rings are not structural elements, but merely theoretical lines to help describe the arrangement of the further inner projections. In this embodiment, the further inner projections are arranged opposite one another inside the connecting sleeve. As a result, the maximum projection heights of the further inner projections define a clear width inside the connecting sleeve that is smaller than the inner diameter of the connecting sleeve from one point of the inner lateral surface to a point of the inner lateral surface opposite this point. Further inner projections arranged in this manner thus reduce the clear width inside the connecting sleeve.

Cleverly, four rings of further inner projections designed as stamping points are provided, two of the rings being arranged at one end of the connecting sleeve and two further rings being arranged adjacent to the connecting disk. In this particularly preferred embodiment, four rings of further inner projections are provided. In this case, two rings are arranged in each half of the connecting sleeve based on the overall length of the connecting sleeve. One ring thereof is arranged close to the end face of the connecting sleeve, another is adjacent to the connecting disk. When two vertically extending scaffold elements are inserted into the connecting sleeve, each of these scaffold elements thus abuts two rings of further inner projections. The two scaffold elements are guided and centered in a static, defined and secure manner. Favorably, in this embodiment, too, the connecting sleeve is made in one piece, and the connecting disk is fastened, in particular welded, to the outer lateral surface of the connecting sleeve.

The described embodiments of a scaffold node, which has both at least one inner projection that protrudes beyond the inner lateral surface of the connecting sleeve and at least one further inner projection that does not protrude abruptly, have particular advantages. Vertical loads are initially introduced directly into the scaffold node, via the abruptly protruding inner projection, from a vertically extending scaffold element which is inserted into the scaffold node. These loads are then in turn transmitted from the scaffold node via the abruptly protruding inner projection to a further, vertically extending scaffold element. An appropriately favorably selected projection height of the abruptly protruding inner projection ensures that the loads from vertically extending scaffold elements are reliably transmitted to and from the abrupt inner projection in any tolerance position of the outer dimensions of these scaffold elements. A further inner projection that is not abrupt and is in particular not sharp-edged helps to center the vertically extending scaffold elements inserted into the scaffold node. Favorably, a plurality of further inner projections are provided for this purpose, which center the vertically extending scaffold elements in the horizontal direction during insertion and also when inserted into the scaffold node. This centering causes the end faces of the vertically extending scaffold elements to be optimally aligned with the abruptly protruding inner projection. As a result, in turn, a reliable and stable flow of force is established between the inserted scaffold elements and the scaffold node. The at least one further inner projection that does not protrude abruptly also transfers horizontal loads from the scaffold node to one or more vertically extending scaffold elements. Horizontal loads can be introduced into the scaffold node via the coupling element. In a three-dimensional composite of scaffold elements, these horizontal loads can or must also be transferred to the vertically extending scaffold elements. This occurs in particular by means of the further inner projections that do not protrude abruptly. This further inner projection is in direct contact with a vertically extending scaffold element inserted into the scaffold node. As a result of this contact, horizontal loads are transferred from the scaffold node, for example, to an inserted vertical post, and vice versa.

The abruptly protruding inner projection is also used, in particular during the assembly of the scaffold or scaffold portion, as a mounting stop when inserting scaffold elements or scaffold components in the longitudinal direction of the connecting sleeve. During mounting, these scaffold elements or scaffold components are simply inserted into the connecting sleeve until their end faces abut the abruptly protruding inner projection. This ensures that the scaffold elements or scaffold components are inserted far enough, but not too far, into the connecting sleeve. The abruptly protruding inner projection is thus also used to center scaffold elements or scaffold components inserted into the connecting sleeve in the longitudinal direction of the scaffold node, and thus to ensure that the two scaffold components or scaffold elements are inserted into the scaffold node by the distance provided for an optimal flow of force.

Advantageously, it is provided that the connecting sleeve has an insertion bevel at at least one of its end faces. Such an insertion bevel is realized for example by a funnel-shaped widening of one end of the connecting sleeve. Such an insertion bevel facilitates the insertion of vertically extending scaffold elements into the connecting sleeve. This is particularly advantageous because the scaffold elements often have to be inserted into the scaffold node at a great height and in hard-to-reach places. An insertion bevel can also be provided at both ends of the connecting sleeve. An insertion bevel may be attached to scaffold nodes according to any of the previously described embodiments.

The features described below may all be combined with any previously described embodiment.

Furthermore, the overall length of the connecting sleeve is greater in relation to the sleeve diameter by a factor of from 2 to 5. In comparison with connecting elements for scaffolds known from the prior art, the overall length of the connecting sleeve and thus of the scaffold node is low. As a result, a scaffold node has compact dimensions and is therefore easy to transport and handle.

In a preferred embodiment, it is provided that the coupling element designed as a connecting disk is arranged centrally in the longitudinal direction of the connecting sleeve. On account of such a central arrangement, the scaffold node is symmetric in the longitudinal direction. This symmetric design is particularly favorable for a statically determinate introduction and dissipation of force into and out of the scaffold node. Of course, the connecting disk can also be arranged at a different location along the overall length of the connecting sleeve.

Furthermore, the overall length of the connecting sleeve on each side of the coupling element designed as a connecting disk to the end of the connecting sleeve is greater than the sleeve diameter by the factor of 0.9 to 2.4. This feature also ensures compact dimensions of the scaffold node and, at the same time, reliable transmission of force in the use state.

In an advantageous embodiment, it is provided that the receiving recesses, in the plan view of the connecting disk and the receiving surface, are arranged regularly, in particular at regular angles with respect to one another based on the axis of symmetry of the connecting sleeve, in the circumferential direction. The receiving recesses in the connecting disk are provided for being form-fittingly connected to horizontally extending scaffold elements that are connected to the scaffold node. For this purpose, a plurality of receiving recesses are favorably provided which are arranged regularly around the circumference of the connecting disk. As a result, a plurality of horizontally extending scaffold elements can be connected to the scaffold node. A regular arrangement of the receiving recesses ensures a defined flow of force through the scaffold node.

Cleverly, it is provided that the connecting sleeve has, at each end in its end regions, at least one locking opening which is directed radially inwardly through the wall of the connecting sleeve. Such a locking opening is used to secure vertically extending scaffold elements introduced into the connecting sleeve. Favorably, similar openings are arranged in the scaffold element, and are referred to as securing openings in this case. Following the introduction of the scaffold elements into the connecting sleeve, the locking opening is made to overlap with a securing opening. A plug-in element is then introduced into said overlapping openings for securing. Favorably, the plug-in element has a smaller diameter than the openings, which leads to play in this form-fit. On account of this play, a hyperstatic quality in the connection of the scaffold node to the introduced vertically extending scaffold elements is avoided.

In a further preferred embodiment, the locking opening is arranged at a distance from the receiving surface of the connecting disk that corresponds at least to the factor of 0.5 of the sleeve diameter, the locking opening being arranged so as to be offset from a first receiving recess at an angle of 45° in the circumferential direction of the connecting sleeve. In order to secure the vertically extending scaffold elements with respect to the scaffold node, the locking opening has to be easy to reach and, in particular, not be covered by scaffold elements arranged on the scaffold node. In order for the locking opening to be easy to reach, it is spaced apart from the connecting disk. In the circumferential direction of the connecting sleeve, the locking opening is arranged so as to be offset from one or preferably from all the receiving recesses in the connecting disk. This positioning of the locking opening makes said opening particularly easy to reach when introducing the plug-in element.

The problem addressed by the invention is also solved by a scaffold portion, comprising at least one scaffold node according to any of the previously described embodiments, further comprising
  at least one vertical post, wherein the vertical post is inserted into the connecting sleeve of the scaffold node,
  at least one horizontal bar or a horizontal strut, which is connected to the coupling element of the scaffold node (1).

A scaffold portion according to the invention is based on a scaffold node according to any of the previously described embodiments and also has further scaffold elements. In general, the advantages that were previously described for the scaffold node also apply to the scaffold portion according to the invention. Further advantages result from the interaction of the other scaffold elements with the scaffold node. A scaffold portion according to the invention is part of a scaffold. The scaffold can also have a plurality of scaffold portions according to the invention. Simple and safe set-up of the scaffold portion in the vertical direction is achieved by a plug-in connection between the scaffold node and one or more vertical posts, the vertical post being inserted into the connecting sleeve. Vertical posts are generally understood to mean scaffold elements that are vertically oriented in the use state and are suitable for transmitting weight forces and moments. In general, the vertical post is inserted into the scaffold node approximately as far as the position at which the connecting disk or another coupling element is attached to the connecting sleeve. Favorably, a second vertical post is inserted from the other, opposite side of the connecting sleeve. The two inserted vertical posts then rest on the inner projection by their end faces. As a result, a flow of force through the scaffold node is ensured. Favorably, a plurality of further inner projections are provided inside the connecting sleeve, which center and guide the two inserted vertical posts. As a result, dimensional tolerances at the outer dimensions of the vertical posts are compensated for and a reliable transmission of force is ensured in the vertical direction from one vertical post to another.

Furthermore, a scaffold portion according to the invention comprises at least one horizontally extending scaffold element in the form of a horizontal bar or a horizontal strut. Said horizontal bar or the horizontal strut is form-fittingly connected to the coupling element, in particular to a scaffold node coupling element designed as a connecting disk. This connection takes place, for example, by a shaped element of the horizontal bar being inserted into a receiving recess in the connecting disk and secured there. The horizontal bar is shaped at its end facing the scaffold node such that an end face arranged there abuts the outer lateral surface of the connecting sleeve. As a result of this abutment, horizontally acting forces, vertically acting forces and torques can be introduced into the scaffold node from the horizontal bar. Of course, the same applies in the other direction from the scaffold node to the horizontal bar, and to a connection of an alternatively designed coupling element, for example as Cuplock elements, wedge pockets or a disk washer, to the scaffold node.

In a preferred embodiment, it is provided that the coupling element is designed as a connecting disk, the connecting disk having a receiving surface having a plurality of receiving recesses, and the receiving recesses being provided for being connected to further scaffold elements, such as horizontal bars or diagonal struts, and the connecting disk being rigidly connected to the connecting sleeve, and the receiving surface being substantially perpendicular to the overall length of the connecting sleeve, and a horizontal bar being form-fittingly connected to one of the receiving recesses in the connecting disk of the scaffold node, a shaped element arranged at the end of the horizontal bar being inserted into one of the receiving recesses and at least part of the horizontal bar end face facing the scaffold node abutting the connecting sleeve. In this embodiment, the coupling element of the scaffold node is designed as a connecting disk. Such a connecting disk makes a particularly secure connection of scaffold elements to the scaffold node possible. Favorably, scaffold elements such as horizontal bars are form-fittingly connected to the connecting disk, and contact is also established between the scaffold element and the outer lateral surface of the connecting sleeve. On account of this double contact, forces and moments are transmitted particularly effectively from the horizontal bar to the scaffold node, and vice versa.

Furthermore, it is favorably provided that the vertical post has at least one securing opening at its end facing the scaffold node, the securing opening corresponding in shape and size to the locking opening of the scaffold node, and a plug-in element being provided which is introduced into the securing opening and the locking opening and both axially and radially secures the vertical post and scaffold node with respect to one another. In this embodiment, the vertical post inserted into the connecting sleeve is secured. At least one locking opening is provided in the connecting sleeve for this purpose, which opening corresponds in shape and size to a securing opening in the vertical post. When inserting the vertical post into the connecting sleeve, the two openings are made to overlap, such that they are in alignment. A plug-in element is then inserted into the two mutually aligned openings for securing. As a result, a form-fit is established between the connecting sleeve, the vertical post and the plug-in element. This securing is important so that the vertical post cannot be accidentally or unintentionally pulled out of the scaffold node.

Favorably, there is play between the plug-in element and the locking opening and/or between the plug-in element and the securing opening, so that the vertical post in the connecting sleeve is movable in the longitudinal direction of said sleeve within the limits of the play. In this embodiment, there is play between the locking opening and/or the securing opening and the plug-in element. The securing of the vertical post in the connecting sleeve is thus not rigid and does not firmly fix the vertical post in the connecting sleeve. This play is intended to avoid a hyperstatic quality. Furthermore, the play is provided to prevent the flow of force flowing from the vertical post through the plug element into the connecting sleeve. In a scaffold node and scaffold portion according to the invention, the flow of force either flows from one inserted scaffold element directly to the next scaffold element or the flow of force is introduced into the scaffold node from an inserted scaffold element via the inner projection and, in turn, introduced into a further inserted scaffold element from the scaffold node via the inner projection. The securing by means of the plug-in element is not provided for dissipating the actual vertical loads of the scaffold portion. The securing serves only to prevent scaffold elements from being unintentionally pulled out of the scaffold node.

In a further embodiment of a scaffold portion, at least one spindle nut post is provided which comprises a tubular post shaft with a spindle nut which is fastened thereto in an axially flush manner, the post shaft being inserted into the connecting sleeve. In this embodiment, a spindle nut post rather than a second vertical post is inserted into the scaffold node. There is then a transmission of force from the vertical post to the spindle nut post in the connecting sleeve. The spindle nut post in this case comprises a post shaft of which the outer diameter corresponds to the outer diameter of a vertical post. The scaffold node is thus suitable for the insertion of both vertical posts and spindle nut posts. A spindle nut post is in turn provided for being connected to a scaffold spindle which is screwed into the spindle nut post. By rotating the spindle nut post, the axial position of the scaffold spindle relative to the spindle nut post is changed. As a result, a scaffold portion can be adapted very easily, for example, to any unevenness in the ground.

The end of the post shaft facing away from the spindle nut is supported on the inner projection of the connecting sleeve or on the vertical post end face inserted into the connecting sleeve. The flow of force from the spindle nut post into the scaffold node and vice versa is analogous to a vertical post. The post shaft acts like the end face of a vertical post. Thus, a scaffold portion according to this embodiment is very flexible and makes it possible to connect various vertically extending scaffold elements to the scaffold node. A single type of scaffold node can thus be used at various locations to meet various requirements in the scaffold portion or scaffold. This considerably simplifies the material logistics for scaffolding construction. One type of scaffold node can be used for various tasks.

The length of the post shaft preferably corresponds to a factor of from 0.5 to 0.8 of the overall length of the connecting sleeve. Favorably, the post shaft is just so long that its end, when inserted into the connecting sleeve, protrudes just beyond the end face of the connecting sleeve. The spindle nut arranged on this end facing away from the interior of the connecting sleeve can be rotated smoothly such that it does not touch the end face of the connecting sleeve. At the same time, the spindle nut post with this length dimensioning is very compact and can thus be easily transported and stored. Furthermore, such a short spindle nut post is very easy to handle. The factor of from 0.5 to 0.8 of the overall length of the connecting sleeve means that the post shaft is at least as long as half the overall length of the connecting sleeve and, favorably, a part thereof protrudes over half the length of the connecting sleeve.

According to the invention, a scaffold node has at least one inner projection that protrudes abruptly beyond the inner lateral surface of the connecting sleeve and is provided for transmitting vertical loads with its load-absorption surface. These vertical loads are transmitted by other scaffold elements or scaffold components inserted into the scaffold node. In addition to this at least one abruptly protruding inner projection, further inner projections may be provided which do not protrude abruptly beyond the inner lateral surface. Usually, the projection height of the further inner projections is smaller than the projection height of the abruptly protruding inner projection. These further inner projections can be designed, for example, as beads or stamping points, as described above, and are used to center vertically extending scaffold elements, inserted into the connecting sleeve, in the scaffold node. Thus, in preferred embodiments, a scaffold node according to the invention can also have two different types of inner projections, namely inner projections that protrude abruptly beyond the inner lateral surface and inner projections that do not protrude abruptly beyond the inner lateral surface. The embodiments of the various inner projections described in detail above can thus be freely combined with one other and are also disclosed in combination with one other.

The described end regions of the horizontal bars on which shaped parts are provided for form-fittingly connecting to a scaffold node can also be referred to as bar heads. Such bar heads have an end face which rests on the outer lateral surface of the connecting sleeve in a scaffold portion.

BRIEF DESCRIPTION OF THE DRAWINGS

Embodiments of the invention are shown schematically in the drawings, in which.

DETAILED DESCRIPTION

Figure 1:
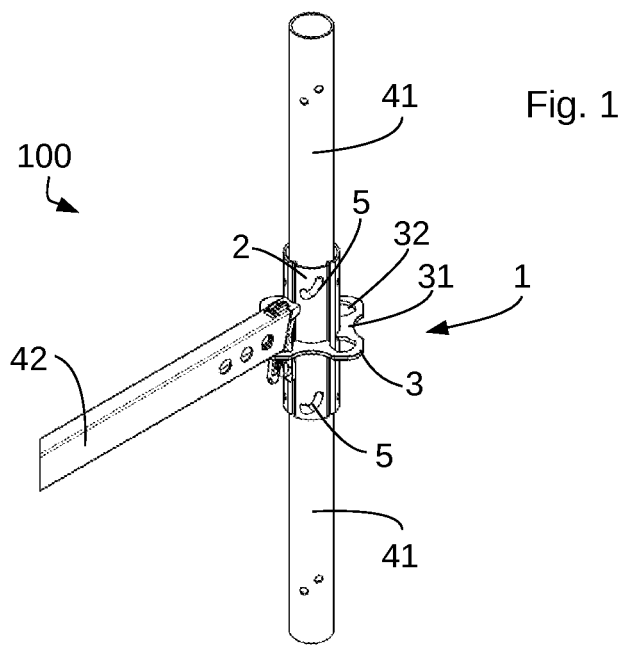
FIG. 1 is a perspective view of a scaffold portion with a first embodiment of a scaffold node that is not part of the invention.

In the drawings, the same elements are provided with the same reference signs. In general, the described properties of an element which are described for one figure also apply to the other figures. Directional information as above or below refers to the figure described and can be transferred to other figures by analogy.

Figure 2:
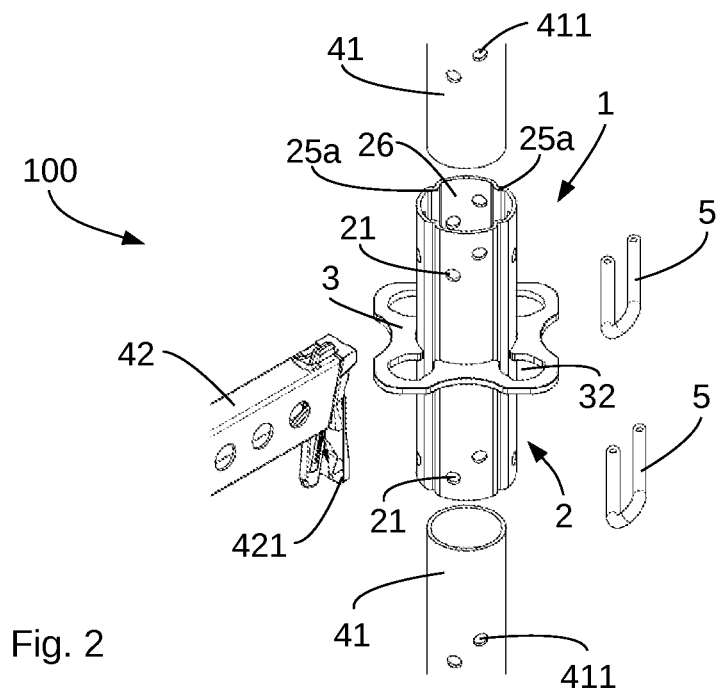
FIG. 2 is an exploded perspective view of the scaffold portion from FIG. 1.

FIG. 1 is a perspective view of a scaffold portion 100 with a first embodiment of a scaffold node 1 that is not part of the invention. The scaffold portion 100 shown is part of a scaffold which comprises further scaffold elements. A scaffold portion 100 can also be arranged several times in a scaffold. A scaffold node 1 according to a first embodiment that is not part of the invention is shown centrally in the middle of the scaffold portion 100. The scaffold node 1 has a vertically extending connecting sleeve 2. A vertical post 41 is inserted in each case from above and below into this connecting sleeve 2. In the first embodiment shown of a scaffold node 1 that is not part of the invention, the mutually facing end faces of the two vertical posts 41 touch one another. These two end faces rest against one other and transmit directly vertical forces between the two vertical posts 41. In order to axially secure the vertical posts 41 in the connecting sleeve 2, two plug-in elements 5 are provided which are simultaneously introduced into locking openings 21 in the connecting sleeve 2 and into securing openings 411 in the vertical posts 41. This results in a form-fit between the vertical posts 41, the scaffold node 1 and the plug-in elements 5. Details of this connection are shown in FIG. 2. The described form-fit has play, such that the two vertical posts 41 are movable relative to the connecting sleeve in a small region in the axial direction of the connecting sleeve 2. This play is used for tolerance compensation for tolerances of the vertical posts 41 and the connecting sleeve 2.

The scaffold node 1 further comprises a connecting disk 3 which is rigidly connected to the connecting sleeve 2. In the case shown, the connecting disk 3 is welded to the connecting sleeve 2 from the outside. The connecting disk 3 has a receiving surface 31 that faces upwards in the figure. Four receiving recesses 32 are introduced into this receiving surface 31. The receiving surface 31 is perpendicular to the central axis of the connecting sleeve 2.

A shaped element 421 of a horizontal bar 42 that extends forwards to the left in the figure is introduced into one of the four receiving recesses 32 in the connecting disk 3. The horizontal bar 42 is thus releasably connected to the connecting disk 3. The horizontal bar 42 can be connected at its end facing away from the scaffold node 1 to various other scaffold elements. For example, this end facing away can be fastened to another scaffold node 1. The scaffold portion shown 100 thus has elements extending both in the vertical direction of a scaffold and in the horizontal direction. The scaffold node 1 is thus an interface between scaffold elements extending in different directions.

FIG. 2 is an exploded perspective view of the scaffold portion 100 from FIG. 1. In FIG. 2, the elements shown in FIG. 1 are dismantled and shown side-by-side. A scaffold node 1 that is not part of the invention according to a first embodiment that is not part of the invention is positioned centrally. The scaffold node 1 comprises a connecting sleeve 2 which is oriented vertically in the figure, and a horizontal connecting disk 3 which is rigidly connected thereto. A plurality of circular locking openings 21 are mounted in the upwardly oriented quarter and the downwardly oriented quarter of the connecting sleeve 2. These locking openings 21 penetrate the wall of the connecting sleeve 2. In the embodiment shown, the connecting sleeve 2 has four further inner projections 25*a* which protrude radially inwardly beyond the inner lateral surface 26 of the connecting sleeve 2. These further inner projections 25*a* are designed as longitudinal beads in this case and extend along the entire length of the connecting sleeve 2. The further inner projections 25*a* are distributed uniformly on the inner lateral surface 26 in the circumferential direction. Based on the central axis of the connecting sleeve 2, the further inner projections 25*a* are in each case at an angle of 90° with respect to one another. Of course, a different number of such further inner projections 25*a* can also be arranged on the inner lateral surface 26.

One end of a vertical post 41 is shown in each case above and below the scaffold node 1. The outer diameter of the vertical posts 41 is slightly smaller than the clear width between the further inner projections 25*a* of the connecting sleeve 2. As a result, the vertical posts 41 can be inserted into the connecting sleeve 2. To get from the state shown in FIG. 2 to the assembled state shown in FIG. 1, the vertical posts 41 are inserted into the connecting sleeve 2 until the downwardly facing end face of the upper vertical post 41 contacts the upwardly facing end face of the lower vertical post 41. In the assembled state, the transmission of vertical forces then takes place directly between the touching end faces of the two vertical posts 41. A plurality of circular securing openings 411 are introduced close to the end faces of the two vertical posts 41. These securing openings 411 are positioned with respect to one another in the same way as the locking openings 21 in the connecting sleeve 2. After insertion of the vertical posts 41 into the connecting sleeve 2, the securing openings 411 overlap with the locking openings 21. In this overlapping state, the securing openings 411 are aligned with the locking openings 21. This results in through-recesses in the connecting sleeve 2 and the vertical posts 41. The plug-in elements 5 can then be inserted into these through-recesses. In FIG. 2, two such plug-in elements 5 are shown to the right of the scaffold node 1. These plug-in elements 5 are U-shaped in this case and have a circular cross section. The two limbs of the plug-in elements 5 are each inserted into a recess which is formed from a securing opening 411 and a locking opening 21. This insertion of a plug-in element 5 into the connecting sleeve 2 and a vertical post 41 results in a form-fit between these three elements. As a result, the vertical post 41 is secured to the connecting sleeve 2 in the axial direction. The state following the introduction of the plug-in elements into the connecting sleeve 2 and vertical post 41 is shown in FIG. 1.

The end of a horizontal bar 42 can be seen at the front left in FIG. 2. The shaped element 421 attached to the rear-right-facing end of the horizontal bar 42 is provided for being introduced into the adjacent receiving recess 32 in the connecting disk 3. On account of the connecting disk 3, horizontal forces introduced by the horizontal bar 42 are then introduced into the scaffold node. Of course, scaffold elements such as further horizontal bars 42 can also be attached to the other three receiving recesses 32 of the connecting disk 3.

Figure 3:
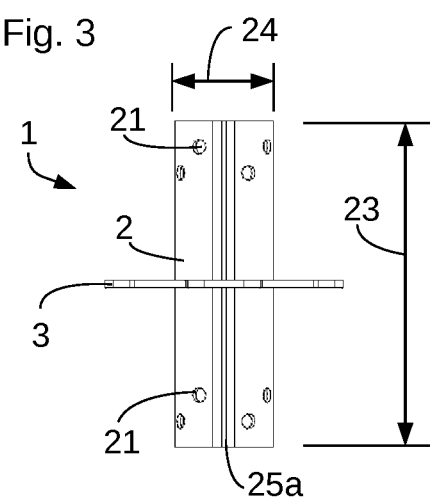
FIG. 3 is a side view of a first embodiment of a scaffold node that is not part of the invention.

FIG. 3 is a side view of a first embodiment of a scaffold node 1 that is not part of the invention. In FIG. 3, the first embodiment of a scaffold node 1 that is not part of the invention, from FIG. 1, is shown separately. The connecting sleeve 2 is hollow inside. The connecting sleeve 2 has the overall length 23. The connecting disk 3 is rigidly connected to the connecting sleeve 2 and arranged centrally on the connecting sleeve 2. The distance from an end face of the connecting sleeve 2 to the connecting disk 3 is thus approximately half of the overall length 23. The connecting sleeve 2 has a sleeve diameter 24. A plurality of locking openings 21 are fitted between the connecting disk 3 and the end faces of the connecting sleeve 2. The shape or the locations or the arrangement of the locking openings 21 can also be implemented differently than in the figure. In the side view, only one further inner projection 25*a* can be seen, which is designed here as a longitudinal bead and extends in parallel with the central axis of the connecting sleeve 2 over the overall length 23.

Figure 4:
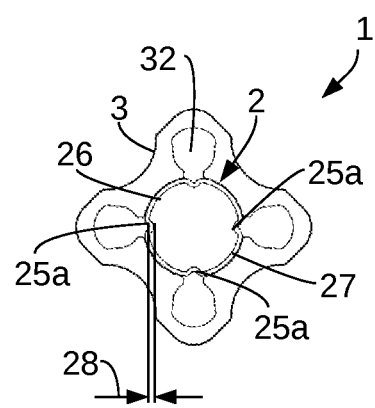
FIG. 4 is a plan view of a first embodiment of a scaffold node that is not part of the invention.

FIG. 4 is a plan view of a first embodiment of a scaffold node 1 that is not part of the invention. In this view, the scaffold node 1 from FIG. 3 can be seen from above. In this view, all four further inner projections 25*a* can be seen. These further inner projections 25*a* project beyond the inner lateral surface 26 of the connecting sleeve 2 by the projection height 28. As a result, the further inner projections 25*a* narrow the clear width inside the connecting sleeve 2. The connecting sleeve 2 is made in one piece in this first embodiment. The further inner projections 25*a* have a constant projection height 28 over the overall length 23. In this first embodiment of a scaffold node 1 that is not part of the invention, the further inner projections 25*a* are used to center a vertical post 41 introduced into the connecting sleeve 2. The further inner projections 25*a* extending at a constant projection height 28 in the longitudinal direction of the connecting sleeve 2 are not suitable for absorbing forces from a vertical post 41 that extend in the longitudinal direction of the connecting sleeve 2 and introducing them into the scaffold node 1. A scaffold node 1 according to this first embodiment that is not part of the invention is used to center two vertical posts 41, introduced into the connecting sleeve 2 from two sides, with respect to one other and to ensure that the end faces of the two vertical posts 41 overlap and rest on one another. The flow of force thus takes place in the longitudinal direction of the connecting sleeve 2 from an inserted vertical post 41 directly to a second inserted vertical post 41. A scaffold node 1 according to the first embodiment therefore does not transmit any vertical forces between two vertical posts 41 introduced into the scaffold node 1 when installed in a scaffold portion 100.

Figure 5:
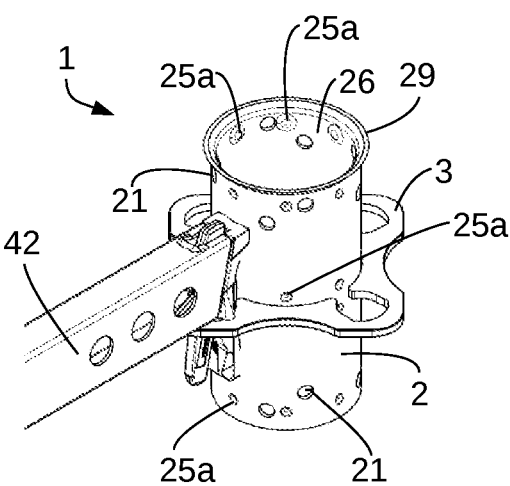
FIG. 5 is a perspective view of a second embodiment of a scaffold node that is not part of the invention.

FIG. 5 is a perspective view of a second embodiment of a scaffold node 1 that is not part of the invention. The second embodiment of a scaffold node 1 that is not part of the invention shown in FIG. 5 differs from the first embodiment in terms of the type and number of the further inner projections 25*a*. In the second embodiment that is not part of the invention, the further inner projections 25*a* are designed as stamping points. The further inner projections 25a are produced by stamping into the outer lateral surface of the connecting sleeve 2. By this stamping, a part of the wall 27 of the connecting sleeve 2 is pressed inward, resulting in the further inner projection 25a. The stamping center is understood to be the central point of a further inner projection 25a designed as a stamping point. Usually, a conical stamping tool is used for stamping, and is pressed onto the connecting sleeve 2 from the outside. The stamping center is formed at the point where the tip of the stamping tool penetrates the connecting sleeve 2. Such further inner projections 25a, which are designed as stamping points, transition smoothly or steadily from the inner lateral surface 26 to the projection height 28. This can be seen particularly well in FIG. 7. In the embodiment shown in FIG. 5, the further inner projections 25a are arranged in four rings. These four rings are parallel to the end faces of the connecting sleeve 2 and the connecting disk 3. Two of these rings are arranged close to the end faces of the connecting sleeve 2. Two further rings are directly adjacent to the connecting disk 3. The further inner projections 25a are arranged uniformly along the rings in the circumferential direction of the connecting sleeve 2. The distance between two adjacent further inner projections 25a of a ring is constant. The second embodiment that is not part of the invention also has locking openings 21, which serve the same purpose as in the first embodiment. The connecting disk 3 is also rigidly connected, for example welded, to the connecting sleeve 2 approximately in the middle of the overall length 23 thereof. In FIG. 5, a horizontal bar 42 is connected to the connecting disk 3. This connection corresponds to the connection in the first embodiment of a scaffold node 1. The further inner projections 25a, designed as stamping points, of the second embodiment that is not part of the invention are used to center vertical posts 41 introduced into the scaffold node 1 with respect to one another. In addition, the further inner projections 25a designed as stamping points are also not provided for transmitting, in vertical posts 41, forces acting in the longitudinal direction of the connecting sleeve 2 to the connecting sleeve 2 and the scaffold node 1. The connecting sleeve 2 has an insertion bevel 29 at its upper end. This insertion bevel 29 facilitates the insertion of a vertical post 41 into the connecting sleeve 2. Such an insertion bevel 29 can also be arranged at both ends of the connecting sleeve 29.

Figure 6:
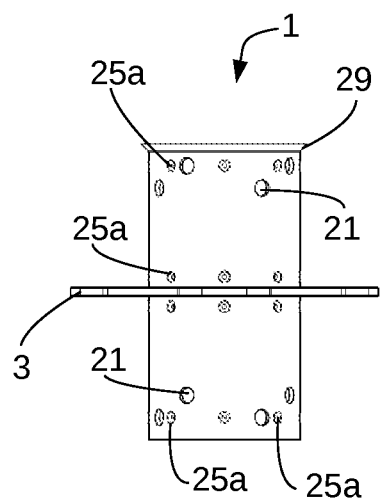
FIG. 6 is a side view of a second embodiment of a scaffold node that is not part of the invention.

FIG. 6 is a side view of a second embodiment of a scaffold node 1. FIG. 6 shows the second embodiment of a scaffold node 1 that is not part of the invention from FIG. 5 from the side. In this view, the four rings of further inner projections 25a designed as stamping points can be clearly seen. The uppermost ring is adjacent to the insertion bevel 29. Two further parallel rings of further inner projections 25a are adjacent to the connecting disk arranged in the middle of the connecting sleeve 2. On the downwardly facing side of the connecting sleeve 2, a fourth ring of further inner projections 25a is adjacent to the end face. The arrangement shown of four such rings is particularly favorable for guiding vertical posts 41 in the connecting sleeve 2. The inserted vertical posts 41 are inserted as far as the middle of the connecting sleeve 2. Any vertical post 41 introduced in this way is, in the introduced state, then centered in the connecting sleeve 2 in each case by two rings of further inner projections 25a. This arrangement has proven to be particularly favorable for the mutual alignment of two vertical posts 41 in the scaffold node 1.

Figure 7:
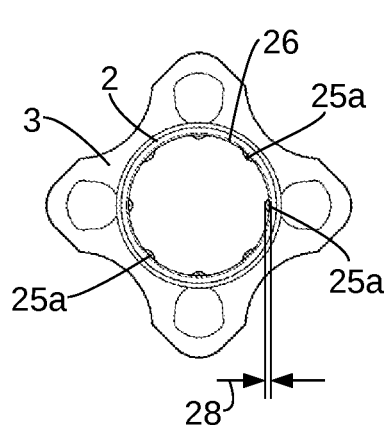
FIG. 7 is a plan view of a second embodiment of a scaffold node that is not part of the invention.

FIG. 7 is a plan view of a second embodiment of a scaffold node 1 that is not part of the invention. In this view, the second embodiment of a scaffold node 1 that is not part of the invention can be seen from above. The uppermost ring of further inner projections 25a can be seen protruding beyond the inner lateral surface 26 of the connecting sleeve 2. In this second embodiment, too, the clear width inside the connecting sleeve 2 is defined by the further inner projections 25a. The further inner projections 25a in this case project beyond the inner lateral surface 26 by the projection height 28. The stamping center of the further inner projections 25a forms the location of the highest projection height 28. The course of the surface of the further inner projections 25a is continuous and extends without sharp edges, starting from the surrounding inner lateral surface 26 up to the maximum projection height 28, which lies in the stamping center. Further inner projections 25a designed in this way are particularly suitable for guiding and centering an inserted vertical post 41. The end face of the inserted vertical post 41 slides, starting from the inner lateral surface 26, along the continuous surface of the further inner projections 25a and is thus guided, during insertion into the connecting sleeve 2, as far as the relevant projection height 28. An inserted vertical post 41 is thus guided together by all the further inner projections 25a into the middle of the connecting sleeve 2 and is thus centered. In the case in which a vertical post 41 is introduced from each side of the connecting sleeve 2, the two vertical posts 41 come into direct contact with another, by their end faces, inside the connecting sleeve 2. Forces extending vertically in the vertical posts 41 are thus transferred directly, and without a detour, from one vertical post 41 to the other via the scaffold node 1. Depending on the application, the number of further inner projections 25a, the rings formed by the further inner projections 25a and the projection height 28 may also be selected differently than in the figure.

Figure 8:
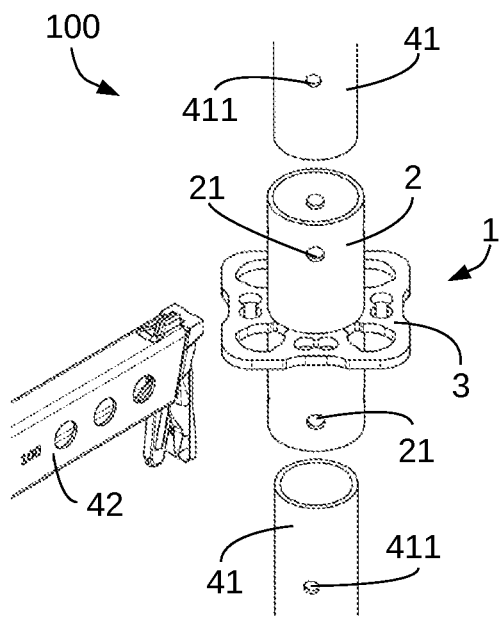
FIG. 8 is an exploded perspective view of a scaffold portion with an embodiment of a scaffold node according to the invention.

FIG. 8 is an exploded perspective view of a scaffold portion 100 with an embodiment of a scaffold node 1 according to the invention. The scaffold portion 100 shown comprises a scaffold node 1 in an embodiment according to the invention. The interfaces of the scaffold node 1 with other scaffold elements such as the vertical posts 41 and the horizontal bar 42 are in this case the same or analogous to the two embodiments described above. The embodiment of the scaffold node 1 according to the inventions differs from the first and the second embodiment that are not part of the invention in terms of the type and design of the inner projection 25. This inner projection 25 cannot be seen in the perspective view in FIG. 8 but is shown and described in FIGS. 9 and 10. The embodiment of a scaffold node 1 according to the invention also has a connecting sleeve 2 with locking openings 21 introduced therein. In order to connect the vertical posts 41 shown above and below the scaffold node 1 to the connecting sleeve 2, the vertical posts 41 are inserted into the connecting sleeve 2 until the locking openings 21 are aligned with the securing openings 411. A plug-in element 5 (not shown in FIG. 8) can then be introduced into these aligned openings for securing. Of course, it is also possible in each case to arrange a plurality of locking openings 21 and securing openings 411 next to one another and to insert a plug-in element 5 into a combination of a locking opening 21 and a securing opening 411 in each case for securing. For example, the locking openings 21 and securing openings 411 can each be arranged in pairs. A corresponding plug-in element 5 can have two functional regions, each of which is inserted into a combination of a locking opening 21 and a securing opening 411. Such an embodiment is shown for example in FIG. 14.

Figure 9:
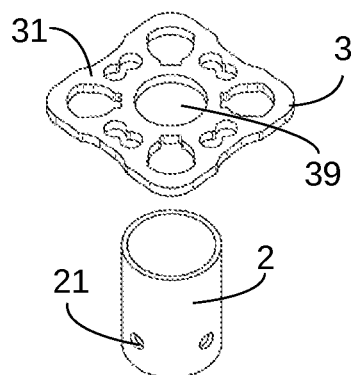
FIG. 9 is an exploded perspective view of an embodiment of a scaffold node according to the invention.
Figure 9:
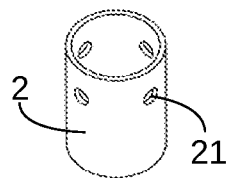

FIG. 9 is an exploded perspective view of an embodiment of a scaffold node 1 according to the invention. In this view, the scaffold node 1 according to an embodiment of the invention also shown in FIG. 8 can be seen in an exploded view. In contrast with the first and the second embodiment that are not part of the invention, the connecting sleeve 2 is made in two parts in this case. A first half of the connecting sleeve 2 is arranged below the connecting disk 3 and is connected, during assembly of the scaffold node 1, by its end face to one of the receiving surfaces 31 of the connecting disk 3. The same connection takes place between the part of the connecting sleeve 2 shown above. The downwardly facing end face thereof is connected to the upwardly facing receiving surface 31 of the connecting disk 3. In the assembled state, which can be seen in FIG. 8, the connecting disk 3 thus divides the connecting sleeve 2 into two halves. The two halves of the connecting sleeve 2 are, however, rigidly connected to the relevant receiving surface 31. Such a connection can be established for example by welding the parts together. In the assembled state of the scaffold node 1 according to the embodiment of the invention, part of the connecting disk 3 protrudes into the interior of the connecting sleeve 2 and forms the inner projection 25 therein. A circular recess 39 is arranged in the middle of the connecting disk 3. The inner diameter of this recess 39 is smaller than the inner diameter of the connecting sleeve 2. Thus, in the assembled state, a part of the connecting disk 3 protrudes into the interior of the connecting sleeve 2. This protruding part, which extends around the recess 39, forms the inner projection 25.

Figure 10:
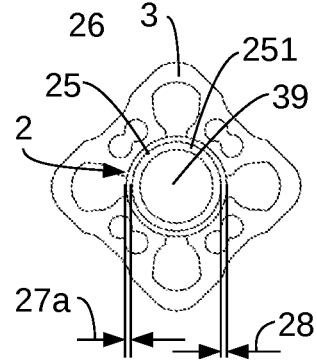
FIG. 10 is a plan view of an embodiment of a scaffold node according to the invention.

FIG. 10 is a plan view of an embodiment of a scaffold node 1 according to the invention. In this view, the embodiment of a scaffold node 1 according to the invention can be seen in the assembled state, as also shown in FIG. 8, from above. It can be clearly seen from this view that a part of the connecting disk 3 protrudes into the interior of the connecting sleeve 2 and forms the inner projection 25 therein. This inner projection 25 surrounds the inner lateral surface 26. The inner projection 25 can also be divided in itself, such that a plurality of inner projections 25 protrude into the interior of the connecting sleeve 2. On account of the fact that the inner projection 25 is formed by the connecting disk 3, there is an abrupt transition between the inner lateral surface 26 of the connecting sleeve 2 and the inner projection 25. The upwardly facing surface of the inner projection 25 arranged in the drawing plane in the view shown in the drawing forms a load-absorption surface 251 in this case. This load-absorption surface 251 is provided for absorbing loads that are introduced by another scaffold element, for example a vertical post 41, in the longitudinal direction of the connecting sleeve 2. In the embodiment according to the invention, in contrast with the first and the second embodiment that are not part of the invention, the inner projection 25 thus introduces loads, by its load-absorption surface 251, from an inserted vertical post 41 into the scaffold node 1. In the case where a vertical post 41 is inserted into the connecting sleeve 2 from both sides, in the third embodiment, the end faces of the two vertical posts 41 do not directly come into contact with one another, but rest on opposing load-absorption surfaces 251 on the scaffold node 1. In the assembled state, the flow of force in the vertical direction is thus from one vertical post 41 initially into the scaffold node 1, and from the scaffold node 1 into the other vertical post 41. In order to provide a sufficiently large load-absorption surface 251, the projection height 28, which is defined in this case from the inner lateral surface 26 to the edge of the inner projection 25 oriented toward the inside of the connecting sleeve 2, is at least as large as the wall thickness 27a of the connecting sleeve 2. In the embodiment shown, the load-absorption surface 251 extends perpendicularly to the inner lateral surface 26. As a result, there is particularly good transmission of force to the end faces of inserted vertical posts 41.

Figure 11:
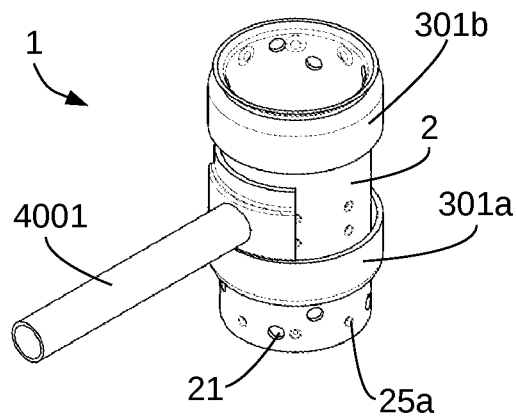
FIG. 11 is a perspective view of a third embodiment of a scaffold node that is not part of the invention.

FIG. 11 is a perspective view of a third embodiment of a scaffold node 1 that is not part of the invention. In this third embodiment of a scaffold node 1 that is not part of the invention, there is no connecting disk 3 provided in the form as in the first three embodiments. The embodiment of a scaffold node 1 that is not part of the invention has a connecting sleeve 2 which is identical to the connecting sleeve 2 of the second embodiment, as shown in FIG. 5 to 7. In order to be connected to horizontally extending scaffold elements, the third embodiment that is not part of the invention has two Cuplock elements 301a and 301b, which form the coupling element. Between these two Cuplock elements 301a and 301b, a horizontal strut 4001 is connected to the scaffold node and points toward the front left in the view. The connecting sleeve 2 is provided, as in the previously described embodiments, such that vertical posts 41 are inserted from above and below into the interior of the connecting sleeve 2. The two Cuplock elements 301a and 301b are constructed in the shape of a collar. The two Cuplock elements 301a and 301b are designed to be rotationally symmetric about a central axis. This central axis coincides with the central axis or axis of symmetry of the connecting sleeve 2. The Cuplock element 301a, which is arranged further below on the connecting sleeve 2, has, on its downwardly facing side, an inner diameter which corresponds approximately to the outer diameter of the connecting sleeve 2. On the other hand, the inner diameter further up on the Cuplock element 301a is selected to be larger, such that, facing upwards, there is a distance or gap between the inner diameter of the Cuplock element 301a and the outer diameter of the connecting sleeve 2. An end piece of the horizontal strut 4001 can be introduced into this gap. The bottom Cuplock element 301a is rigidly connected to the connecting sleeve in its lower region. The top Cuplock 301b corresponds to the bottom Cuplock element 301a. However, the top Cuplock element 301b is not rigidly connected to the connecting sleeve 2 but is mounted so as to be axially displaceable relative thereto. In order to be connected to the horizontal strut 4001, initially, as shown in FIG. 11, the top Cuplock element 301b is displaced upward relative to the connecting sleeve 2. This creates a large distance between the two Cuplock elements 301a and 301b. In the state shown, the horizontal strut 4001 is introduced, by an appropriately shaped end region, into the gap between the bottom Cuplock element 301a and the outer wall of the connecting sleeve 2. The top Cuplock element 301b is then displaced downwards along the connecting sleeve 2, such that the gap between the inner diameter of the top Cuplock element 301b and the outer diameter of the connecting sleeve 2 also encompasses the upper part of the end region of the horizontal strut 4001. In this state, in which the two Cuplock elements 301a and 301b are pushed together and surround the end region of the horizontal strut 4001, the horizontal strut 4001 is rigidly connected to the scaffold node 1.

Figure 12:
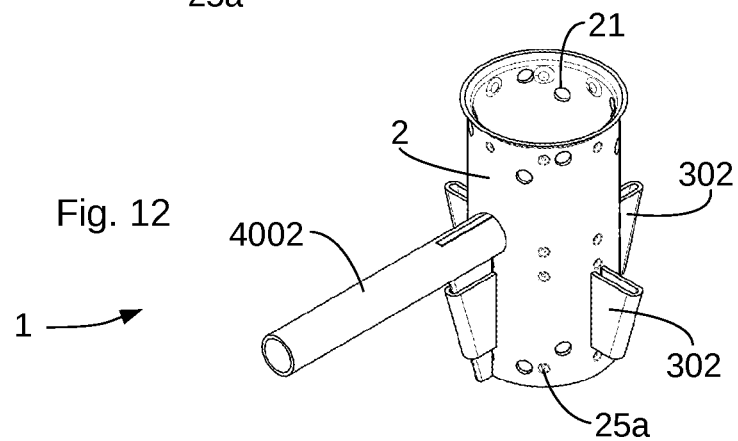
FIG. 12 is a perspective view of a fourth embodiment of a scaffold node that is not part of the invention.

FIG. 12 is a perspective view of a fourth embodiment of a scaffold node 1 that is not part of the invention. In the shown fourth embodiment of a scaffold node 1 that is not part of the invention, there is likewise no connecting disk 3 present. The connecting sleeve 2 is identical to the second embodiment that is not part of the invention, as shown in FIG. 5 to FIG. 7. For the connection to horizontally extending scaffold elements, four wedge-locking pockets 302 are uniformly arranged on the circumference of the outer surface of the connecting sleeve 2 in the fourth embodiment that is not part of the invention. Oriented toward the front left, a horizontal strut 4002 can be seen which has an end region facing the connecting sleeve 2. This region is designed wedge-shaped and fits into the wedge-locking pocket 302. In order for the horizontal strut 4002 to be connected to the scaffold node 1, the wedge-shaped end region of the horizontal strut 4002 is inserted into the wedge-locking pocket 302. On account of the wedge shape of the end region, the horizontal strut 4002 is definitively positioned and fixed in the wedge-locking pocket 302. In the embodiment shown, four wedge-locking pockets 302 are arranged regularly, which means at a constant distance from one other, around the circumference of the connecting sleeve 2. The wedge-locking pockets 302 are in this case made from sheet metal and welded to the connecting sleeve 2.

Figure 13:
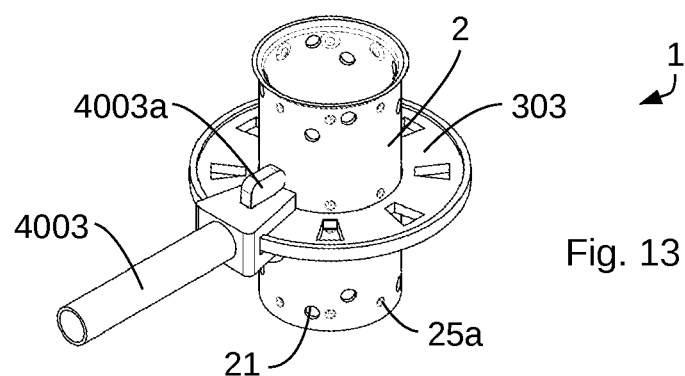
FIG. 13 is a perspective view of a fifth embodiment of a scaffold node that is not part of the invention.

FIG. 13 is a perspective view of a fifth embodiment of a scaffold node 1 that is not part of the invention. There is also no connecting disk 3 according to the first three embodiments in this embodiment. Instead, for the connection to horizontally extending scaffold elements, a disk washer 303 is rigidly connected to the connecting sleeve 2. In this embodiment, too, the connecting sleeve 2 corresponds to the connecting sleeve 2 of the second embodiment that is not part of the invention, as shown in FIG. 5 to 7. In the fifth embodiment that is not part of the invention, a disk washer 303 is mounted centrally on the connecting sleeve. A plurality of substantially wedge-shaped recesses are introduced into the disk washer 303 and penetrate the disk washer 303. These recesses are used for connecting to horizontally extending scaffold elements, such as a horizontal strut 4003, which is oriented toward the front left in this case. The disk washer 303 has, at its outer periphery, an edge which protrudes in the longitudinal direction of the connecting sleeve 2. The horizontal strut 4003 has an end region which at least partially corresponds to the negative of the shape of the disk washer 303. As a result, this end region can be form-fittingly connected to the disk washer 303. To secure the horizontal strut 4003 to the scaffold node 1, a bar element 4003a is then introduced into the end region of the horizontal strut 4003. This bar element 4003a then penetrates the end region and one of the recesses in the disk washer 303. As a result, the horizontal strut 4003 is securely fixed to the disk washer 303 and thus to the scaffold node 1.

The third, fourth and fifth embodiments that are not part of the invention and are shown in FIGS. 11, 12 and 13 are in each case based on a connecting sleeve 2 according to the second embodiment that is not part of the invention. Alternatively, the third, fourth and fifth embodiments can, however, have differently designed connecting sleeves 2, in particular having inner projections 25 designed according to the invention. The third, fourth and fifth embodiments can thus also be freely combined with connecting sleeves 2 as per the embodiment of a scaffold node 1 according to the invention.

Figure 14:
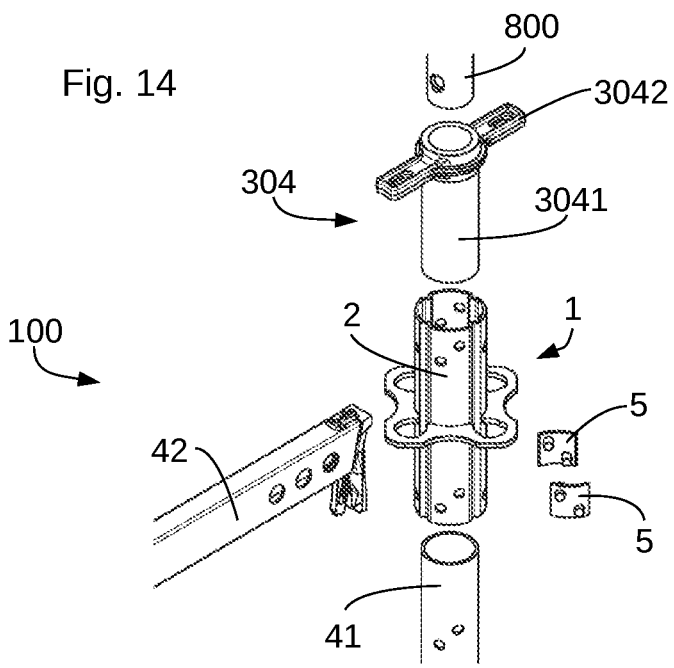
FIG. 14 is an exploded perspective view of a scaffold portion that is not part of the invention, with a spindle nut post.

FIG. 14 is an exploded perspective view of a scaffold portion 100 that is not part of the invention, with a spindle nut post 304. The central element of the scaffold portion 100 shown is a scaffold node 1 according to the first embodiment that is not part of the invention, as shown and described in FIG. 2 to 4. For details on the scaffold node 1, reference is made to the corresponding description of these figures. A horizontal bar 42 can be seen to the left of the scaffold node 1, and a vertical post 41 can be seen below the scaffold node 1. For the connection of the scaffold node 1 to the horizontal bar 42 and the vertical post 41, reference is made to the description of the figures that relates to FIG. 1. The two plug-in elements 5 shown to the right of the scaffold node 1 are designed in this case as plates, which have two pin-like attachments. To connect or secure the elements to one other, the pin-like attachments of the plug-in elements 5 are inserted into the corresponding locking openings 21 and securing openings 411. Reference should also be made to the description of FIG. 1 for this connection. Above the scaffold node 1, a spindle nut post 304 can be seen in FIG. 14. This spindle nut post 304 has a post shaft 3041 in its lower region. This post shaft 3041 has an outer diameter which is slightly smaller than the clear width of the connecting sleeve 2 of the scaffold node 1. The post shaft 3041 can thus be inserted into the connecting sleeve 2 analogously to a vertical post 41. At the upper end of the spindle nut post 304, a spindle nut 3042 is arranged which is rigidly connected to the post shaft 3041. Both the post shaft 3041 and the spindle nut 3042 are hollow inside. A scaffold spindle 800 can be seen above the spindle nut post 304. This scaffold spindle 800 has an external thread which matches the internal thread which is arranged in the axial direction inside the spindle nut 3042. The scaffold spindle 800 can thus be screwed into the spindle nut post 304. Proceeding from the exploded view in FIG. 14, the scaffold node 1, spindle nut post 304 and scaffold spindle 800 are interconnected as follows: first, the post shaft 3041 is inserted into the connecting sleeve 2. Securing with a plug-in element 5 does not take place in this connection, since the spindle nut post 304 is intended to be rotatably mounted in the scaffold node 1. On the downwardly facing side, a vertical post 41 is already introduced into the scaffold node 1 and secured with a plug-in element 5 in this state. Following the introduction of the post shaft 3041 into the connecting sleeve 2, its downwardly facing end face rests on the upwardly facing end face of the vertical post 41 and is supported thereon. In the next step, the scaffold spindle 800 is inserted into the spindle nut post 304 from above. For this purpose, the spindle nut post 304 is rotated, as a result of which the two threads mesh and pull the scaffold spindle 800 into the spindle nut post 304. Due to the hollow design of the spindle nut post 304 and the adjoining vertical post 41, there is sufficient space within the connecting sleeve to accommodate the scaffold spindle 800 that is pulled in downwards. An assembled scaffold portion 100 then has the very practical functionality whereby, by rotating the spindle nut post 304, the scaffold post 800 can be varied and adjusted in its position with respect to the connecting sleeve 2. This is particularly useful when setting up scaffolds where often differing heights of the ground on which the scaffold is erected have to be compensated for. The scaffold portion 100 shown is simple in design, robust and consists of easy-to-produce parts. All components used are compact and therefore easy to transport. Since the outer diameter of the post shaft 3041 corresponds to the outer diameter of a vertical post 41, a spindle nut post 304 can of course also be introduced into a scaffold node 1 from below. An embodiment in which a spindle nut post 304 is inserted into the connecting sleeve 2 on each of the two sides is also conceivable. Furthermore, it is possible to combine the spindle nut post 304 shown in FIG. 14 with one of the other described embodiments of a scaffold node, in particular with the second and the third embodiment.

Figure 15:
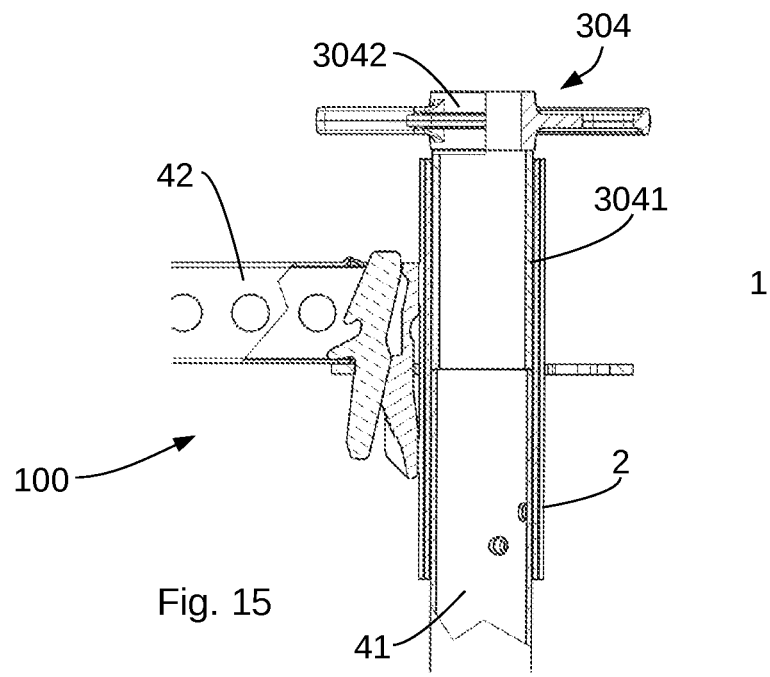
FIG. 15 is a sectional side view of a scaffold portion that is not part of the invention, with a spindle nut post.

FIG. 15 is a sectional side view of a scaffold portion 100 that is not part of the invention, with a spindle nut post 304. In this side view, the elements from FIG. 14 are shown connected to one another. The scaffold node 1 can also be seen centrally here. On the left-hand side, the horizontal bar 42 is connected to the scaffold node 1. A vertical post 41 is inserted into the connecting sleeve 2 from below and is introduced approximately as far as the middle of the overall length 23 of the connecting sleeve 2. A spindle nut post 304 is inserted into the connecting sleeve 2 from above. The post shaft 3041 is also inserted into the connecting sleeve 2 approximately as far as the middle thereof. The fact that the outer lateral surface of the post shaft 3041 and the vertical post 41 abut the inner lateral surface 26 of the connecting sleeve 2 can be clearly seen in this sectional view. The end faces of the post shaft 3041 and the vertical post 41 rest on one another. Due to this resting, forces and loads acting in the vertical direction are transmitted from the spindle nut post 304 directly to the vertical post 41 and vice versa via the two end faces. The length of the post shaft 3041 is slightly longer than half the overall length 23 of the connecting sleeve 2. Thus, the length of the post shaft 3041 corresponds approximately to a factor of from 0.5 to 0.8 of the overall length 23 of the connecting sleeve 2. As a result, very compact dimensions of the scaffold portion 100 are achieved. The scaffold spindle 800 from FIG. 14 is not shown in FIG. 15. In order to introduce a scaffold spindle 800, this is inserted into the spindle nut 3042 from above. For this purpose, the spindle nut post 304 is rotated, as a result of which the scaffold spindle 800 moves relative to the scaffold node 1 in the vertical direction. The scaffold spindle 800 can penetrate into the hollow interior of the post shaft 3041 and the vertical post 41 during this vertical movement. During rotation of the spindle nut post 304, a relative movement takes place from the downwardly facing end face of the spindle nut post 304 relative to the upwardly facing end face of the vertical post 41. Of course, a spindle nut post 304 may also be introduced into a scaffold node 1 according to the second embodiment that is not part of the invention, or an embodiment according to the invention. When introducing a spindle nut post 304 into a scaffold node 1 according to the embodiment according to the invention, the end of the post shaft 3041 facing away from the spindle nut 3042 is supported on the load-absorption surface 251 of the inner projection 25.

Figure 16:
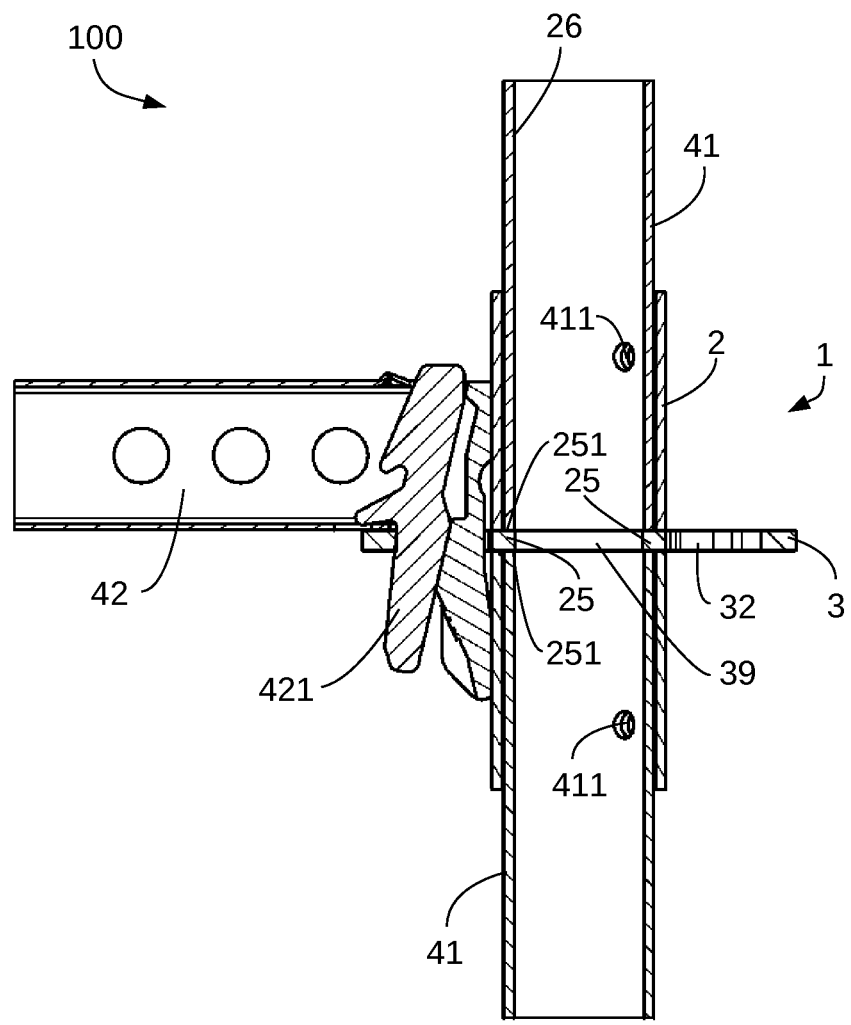
FIG. 16 is a sectional side view of a scaffold portion according to the invention with two inserted vertical posts.

FIG. 16 is a sectional side view of a scaffold portion 100 according to the invention with two inserted vertical posts 41. A scaffold node 1 according to the invention, in which a vertical post 41 is inserted in each case from above and from below, is arranged centrally. The end faces of these vertical posts 41 rest on an abruptly protruding inner projection 25 that is circumferentially arranged inside the connecting sleeve 2. In this case, the end surfaces of the vertical posts 41 touch the load-absorption surfaces 251 of the inner projection 25. Loads in the vertical direction are introduced into the inner projection 25 via the end face of the vertical post 41 inserted at the top of the scaffold node 1, for example. From the inner projection 25, the vertical loads are then conveyed directly to the vertical post 41 inserted at the bottom of the scaffold node 1, the upwardly facing end face of which post touches the inner projection 25 from below. The inner diameter of the connecting sleeve 2 is slightly larger than the outer diameter of the vertical posts 41. In the embodiment shown, there are no further inner projections 25*a* on the inner lateral surface 26. In order to further improve the centering in the horizontal direction in the scaffold node 1, however, it is also possible to arrange further inner projections 25*a* that do not protrude abruptly beyond the inner lateral surface 26. Such further inner projections 25*a* are shown and described for example in FIG. 1 to 7. Although the embodiments shown in these figures alone are not part of the invention, the further inner projections 25*a* according to the invention can be combined with the embodiments of a scaffold node 1 according to the invention shown in FIGS. 8, 9, 10 and 16 to 19.

In FIG. 16, a horizontal bar 41 is fastened on the left-hand side of the scaffold node 1. This fastening takes place by a shaped element 421 of the horizontal bar 42 being inserted into a receiving recess 32 in the coupling element, designed as a connecting disk 3, of the scaffold node 1.

Figure 17:
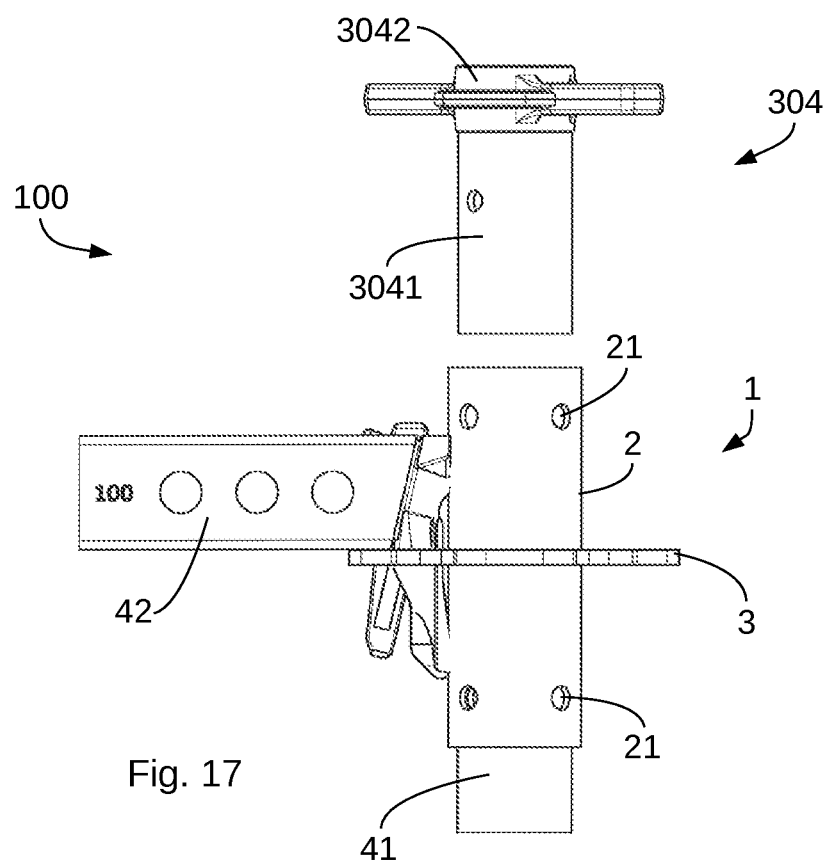
FIG. 17 is a side view of a scaffold portion according to the invention with a spindle nut post shown above the scaffold node.

FIG. 17 is a side view of a scaffold portion 100 according to the invention with a spindle nut post 304 shown above the scaffold node 1. This view also shows, centrally, a scaffold node 1 according to the invention, to which a horizontal bar 42 is fastened on the left-hand side. A vertical post 41 is already inserted into the connecting sleeve 2 from below. Inside the connecting sleeve 2, the end face of this vertical post 41 strikes the inner projection 25 located inside said sleeve. Above the scaffold node 1, a spindle nut post 304 is already arranged coaxially thereto. This spindle nut post 304 is designed identically to that in FIGS. 14 and 15. In respect of the design and functioning of the spindle nut post 304, reference is thus made to the description of FIGS. 14 and 15. Proceeding from the state shown in FIG. 17, the spindle nut post 304 is inserted from above into the connecting sleeve 2 until the lower end face of the post shaft 3041 rests on the inner projection 25 of the scaffold node 1. This state is shown in FIG. 18.

Figure 18:
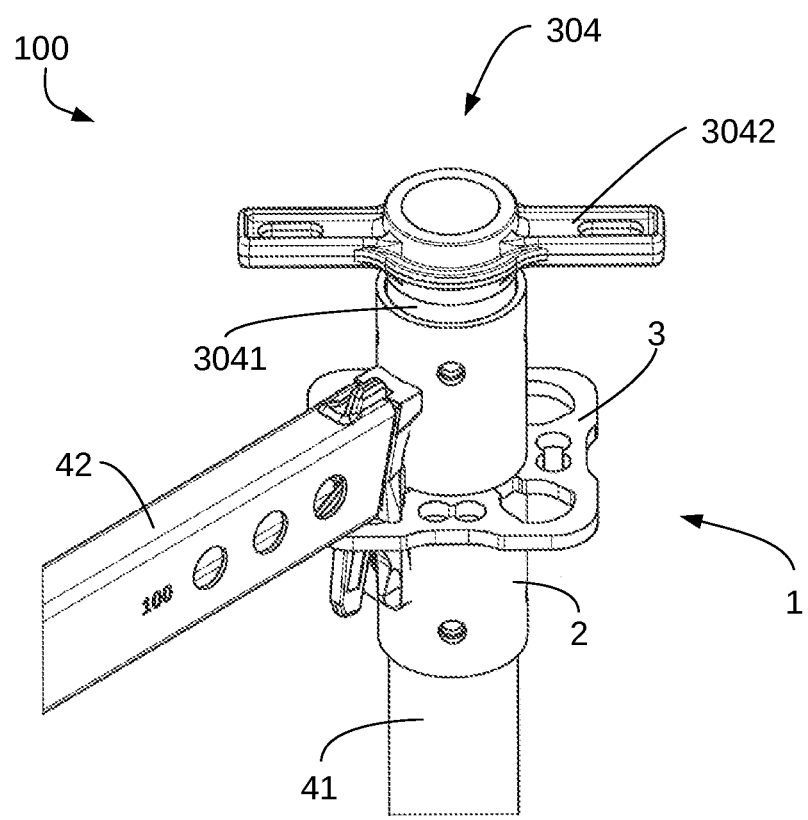
FIG. 18 is a perspective view of a scaffold portion according to the invention with an inserted spindle nut post.

FIG. 18 is a perspective view of a scaffold portion 100 according to the invention with an inserted spindle nut post 304. FIG. 18 shows the same components as FIG. 17. In FIG. 18, the spindle nut post 304 is inserted from above into the connecting sleeve 2 of the scaffold node 1. It can clearly be seen that the post shaft 3041 is longer than the region of the connecting sleeve 2, which region in the longitudinal direction from the inner projection 25 (which is arranged at the same height as the connecting disk 3) as far as the upper end of the connecting sleeve 2. This ensures that the end face of the post shaft 3041 always rests on the load-absorption surface 251 of the inner projection 25. Resting of the spindle nut 3042 on the upper edge of the connecting sleeve 2 is thus excluded. This ensures that the desired flow of force always takes place and the spindle nut post 304 is rotatably mounted in the scaffold node 1.

Figure 19:
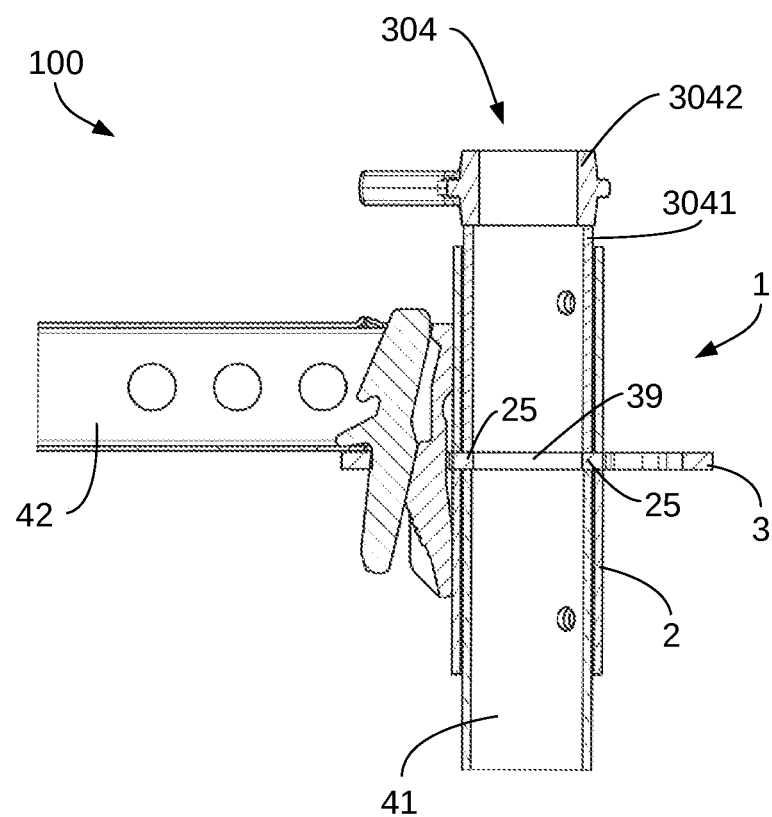
FIG. 19 is a sectional side view of a scaffold portion according to the invention with an inserted spindle nut post.

FIG. 19 is a sectional side view of a scaffold node 100 according to the invention with an inserted spindle nut post 304. In this view, the state shown in FIG. 18 can be seen in a section from the side. It can be clearly seen here that the downwardly facing end face of the vertical post 3041 rests on the inner projection 25 from above. The lower face of the inner projection 25 rests on the upwardly facing end face of the vertical post 41. As a result, a direct flow of force is ensured from the spindle nut post 304 through the abruptly protruding inner projection 25 to the vertical post 41 arranged below. In this view, it can also be clearly seen that a circular recess 39 is arranged in the middle of the coupling element designed as a connecting disk 3. This circular recess 39 is surrounded by the inner projection 25. As described above, a scaffold spindle (not shown here) can be screwed into the spindle nut 3042. This screwed-in scaffold spindle can first be guided through the hollow interior of the post shaft 3041. Furthermore, the scaffold spindle can then be guided through the circular recess 39 past the inner projection 25 into the vertical post 41 inserted at the bottom of the scaffold node 1, which post is also hollow inside.

None of the embodiments shown in FIGS. 1, 2, 3, 4, 5, 6, 7, 11, 12, 13, 14 and 15 has an inner projection 25 that protrudes abruptly beyond the inner lateral surface 26 of the connecting sleeve 2. In these figures, in each case further inner projections 25a are shown and described in the associated parts of the description. These further inner projections 25a can be freely combined with embodiments according to the invention. For instance, it is possible to additionally provide the embodiment shown and described in FIG. 17 to 19 with further inner projections 25a. Embodiments of a scaffold node 1 are thus disclosed which have two types of inner projections, namely with at least one abruptly protruding inner projection 25 and at least one further inner projection 25a, and which particularly favorably achieve centering of vertically extending scaffold elements, such as vertical posts, in a scaffold node 1 or a scaffold portion 100.

Features which do not relate to the further inner projection 25a and are shown and described in FIGS. 1, 2, 3, 4, 5, 6, 7, 11, 12, 13, 14 and 15 can be freely combined with embodiments according to the invention. For example, features relating to the dimensions of the scaffold node 1 and to embodiments of the coupling element, for example as a connecting disk 3, are transferable to the embodiments of the invention.

The invention claimed is:

1. A scaffold portion, comprising:
at least one scaffold node comprising:
a connecting sleeve configured as a coupling point for two scaffold components comprising at least one vertical post, the connecting sleeve comprising a first half of the connecting sleeve and a second half of the connecting sleeve, the first half of the connecting sleeve being distinct from the second half of the connecting sleeve,
a connecting disk configured to connect the scaffold node to further scaffold components or elements, the further scaffold components or elements comprising at least one horizontal bar or a horizontal strut, wherein the at least one connecting disk is distinct from the first half of the connecting sleeve and the second half of the connecting sleeve,
wherein the connecting disk defines at least one inner projection that protrudes radially inwardly beyond an inner lateral surface of the connecting sleeve, wherein the at least one inner projection protrudes abruptly relative to the inner lateral surface of the connecting sleeve and has at least one load-absorption surface configured for absorbing loads oriented in the longitudinal direction of the connecting sleeve from a scaffold component, the at least one inner projection having a projection height from its outer edge adjacent to the inner lateral surface to its inner edge that is oriented radially toward the inside of the connecting sleeve,
the connecting disk having a receiving surface defining an upper receiving surface and a lower receiving surface and having a plurality of receiving recesses, and the receiving recesses configured for connecting to the further scaffold components or elements, the connecting disk being rigidly connected to the connecting sleeve, the receiving surface being substantially perpendicular to the overall length of the connecting sleeve, and
the connecting disk dividing the connecting sleeve into two parts such that the first half of the connecting sleeve is arranged below the connecting disk and an upwardly-facing end face of the first half of the connecting sleeve is rigidly connected to the lower receiving surface and the second half of the connecting sleeve is arranged above the connecting disk and a downwardly-facing lower end face of the second half of the connecting sleeve is rigidly connected to the upper receiving surface;
the at least one vertical post insertable into the connecting sleeve of the scaffold node, wherein the vertical post defines at least one securing opening at an end close to the scaffold node, the securing opening corresponding in shape and size to a locking opening of the scaffold node;
the at least one horizontal bar configured to be connected to the connecting disk of the scaffold node, or the horizontal strut configured to be connected to the connecting disk of the scaffold node; and
a plug-in element configured to be introduced into the securing opening and the locking opening, the plug-in element being configured to both axially and radially secure the vertical post and scaffold node with respect to one another, wherein there is play between the plug-in element and the locking opening and/or between the plug-in element and the securing opening, so that the vertical post in the connecting sleeve is movable in the longitudinal direction of said sleeve within the limits of the play.

2. The scaffold portion according to claim 1, wherein the projection height is equal to or greater than a wall thickness of the connecting sleeve.

3. The scaffold portion according to claim 1, wherein the connecting disk is arranged centrally in the longitudinal direction of the connecting sleeve.

4. The scaffold portion according to claim 1, wherein the overall length of the connecting sleeve on each side of the connecting disk to the end of the connecting sleeve is greater than the sleeve diameter by the factor of 0.9 to 2.4.

5. The scaffold portion according to claim 1, wherein the plurality of receiving recesses, in the plan view on the connecting disk and the receiving surface, are arranged regularly at regular angles with respect to one another based on the axis of symmetry of the connecting sleeve, in the circumferential direction.

6. The scaffold portion according to claim 1, wherein the connecting sleeve has, at each end in its end regions, at least one locking opening which is directed radially inwardly through the wall of the connecting sleeve.

7. The scaffold portion according to claim 6, wherein the locking opening is arranged at a distance from the receiving surface of the connecting disk which corresponds at least to the factor of 0.5 of the sleeve diameter, the locking opening being arranged so as to be offset from the receiving recess at an angle of 45° in the circumferential direction of the connecting sleeve.

8. The scaffold portion according to claim 1, further comprising: the horizontal bar being form-fittingly connected to one of the receiving recesses in the connecting disk of the scaffold node, a shaped element arranged at the end of the horizontal bar being inserted into one of the receiving recesses and at least part of the horizontal bar end face facing the scaffold node abutting the connecting sleeve.

9. The scaffold portion according to claim 1, wherein at least one spindle nut post is provided which comprises a tubular post shaft with a spindle nut which is fastened thereto in an axially flush manner, the post shaft being inserted into the connecting sleeve.

10. The scaffold portion according to claim 9, wherein the end of the post shaft facing away from the spindle nut is supported on the inner projection.

11. The scaffold portion according to claim 9, wherein the length of the post shaft corresponds to a factor of from 0.5 to 0.8 of the overall length of the connecting sleeve.

\* \* \* \* \*